(12) United States Patent
Shin

(10) Patent No.: US 12,273,653 B2
(45) Date of Patent: Apr. 8, 2025

(54) CHAT VIEW MODIFICATION BASED ON USER IDENTIFICATION OR USER MOVEMENT

(71) Applicant: Google LLC, Mountain View, CA (US)

(72) Inventor: Dongeek Shin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 254 days.

(21) Appl. No.: 17/944,893

(22) Filed: Sep. 14, 2022

(65) Prior Publication Data

US 2024/0089403 A1 Mar. 14, 2024

(51) Int. Cl.
| | |
|---|---|
| H04N 7/14 | (2006.01) |
| G06T 7/70 | (2017.01) |
| G06V 40/16 | (2022.01) |
| H04L 12/18 | (2006.01) |
| H04L 51/046 | (2022.01) |
| H04N 7/15 | (2006.01) |

(52) U.S. Cl.
CPC .............. *H04N 7/147* (2013.01); *G06T 7/70* (2017.01); *G06V 40/161* (2022.01); *H04L 12/1822* (2013.01); *H04L 51/046* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 7,783,075 B2 * | 8/2010 | Zhang | H04N 7/147 382/173 |
| 2008/0259154 A1 | 10/2008 | Garrison et al. | |
| 2010/0205667 A1 | 8/2010 | Anderson et al. | |
| 2013/0139256 A1 * | 5/2013 | Tegreene | H04N 21/44218 726/22 |
| 2017/0142371 A1 | 5/2017 | Barzuza et al. | |
| 2018/0152667 A1 | 5/2018 | Taine et al. | |

(Continued)

OTHER PUBLICATIONS

Face Detection and Tracking Using the KLT Algorithm, https://www.mathworks.com/help/vision/ug/face-detection-and-tracking-using-the-klt-algorithm.html, retrieved on Sep. 19, 2022, 6 pages.

(Continued)

*Primary Examiner* — Quoc D Tran
(74) *Attorney, Agent, or Firm* — DORITY & MANNING P.A.

(57) ABSTRACT

According an embodiment, a computing device can: identify, in a chat view associated with a video chat session, a first authorized participant and a second authorized participant of the video chat session; render, in the chat view, first visual data indicative of the first authorized participant and second visual data indicative of the second authorized participant based at least in part on identification of the first authorized participant and the second authorized participant, respectively; define, in the chat view, a chat zone indicative of a reference location of the first authorized participant; determine that the first authorized participant moved outside the chat zone; and/or conceal, in the chat view, the first visual data indicative of the first authorized participant based at least in part on determination that the first authorized participant moved outside the chat zone.

20 Claims, 8 Drawing Sheets

(56) References Cited

U.S. PATENT DOCUMENTS

| | | | |
|---|---|---|---|
| 2018/0285592 A1* | 10/2018 | Sharifi | G06F 21/84 |
| 2019/0147175 A1* | 5/2019 | Varerkar | G06V 10/764 |
| | | | 726/26 |
| 2020/0211201 A1 | 7/2020 | Chiang et al. | |
| 2021/0144338 A1 | 5/2021 | Astarabadi et al. | |
| 2021/0294424 A1* | 9/2021 | Dong | G06V 40/10 |
| 2022/0036708 A1* | 2/2022 | Rey | G06F 21/84 |

OTHER PUBLICATIONS

International Search Report and Written Opinion for Application No. PCT/US2023/030558, mailed Jan. 4, 2024, 19 pages.

* cited by examiner

CHAT VIEW MODIFICATION BASED ON USER IDENTIFICATION OR USER MOVEMENT

FIELD

The present disclosure relates generally to characterizing modifying visual data in a chat view associated with a video chat session. More particularly, the present disclosure relates to modifying visual data in a chat view associated with a video chat session based at least in part on user identification and/or user movement.

BACKGROUND

In some existing video chat systems (e.g., video conference systems), a user participating in a video chat session (e.g., a video conference) can modify certain visual data (e.g., image(s), video) in a chat view associated with the video chat session. For example, in such systems, a user can alter a background of a chat view such that only visual data (e.g., image(s), video) representing the user is rendered in a foreground of the chat view. That is, for instance, the user can alter visual data (e.g., image(s), video) representing other entities (e.g., objects, people) that is rendered in the background of the chat view such that only visual data (e.g., image(s), video) representing the user is rendered in the foreground of the chat view.

In some existing video chat systems, the user can blur and/or reduce the resolution of the visual data (e.g., image(s), video) representing other entities such that these entities are concealed (e.g., hidden, masked) in the background of the chat view during the video chat session. In some existing video chat systems, the user can apply a pre-defined background (e.g., an image, an animation) in the chat view to conceal other entities during the video chat session while rendering visual data (e.g., image(s), video) representing the user in the foreground of the chat view. A problem with such video chat systems is that they fail to address user inconsistency (e.g., video chat participants versus non-participants) and spatial inconsistency of a user (e.g., the relocation and/or repositioning of a video chat participant within the chat view).

SUMMARY

Aspects and advantages of embodiments of the present disclosure will be set forth in part in the following description, or can be learned from the description, or can be learned through practice of the embodiments.

According to one example embodiment, a computing device can include one or more processors and one or more non-transitory computer-readable media that store instructions that, when executed by the one or more processors, cause the computing device to perform operations. The operations can include identifying, in a chat view associated with a video chat session, a first authorized participant and a second authorized participant of the video chat session. The operations can further include rendering, in the chat view, first visual data indicative of the first authorized participant and second visual data indicative of the second authorized participant based at least in part on identification of the first authorized participant and the second authorized participant, respectively. The operations can further include defining, in the chat view, a chat zone indicative of a reference location of the first authorized participant. The operations can further include determining that the first authorized participant moved outside the chat zone. The operations can further include concealing, in the chat view, the first visual data indicative of the first authorized participant based at least in part on determination that the first authorized participant moved outside the chat zone.

According to another example embodiment, a computer-implemented method of modifying visual data in a chat view associated with a video chat session can include identifying, by a computing device comprising one or more processors, in the chat view, an authorized participant of the video chat session. The computer-implemented method can further include rendering, by the computing device, in the chat view, first visual data indicative of the authorized participant based at least in part on identification of the authorized participant. The computer-implemented method can further include detecting, by the computing device, in the chat view, an unauthorized participant of the video chat session. The computer-implemented method can further include concealing, by the computing device, in the chat view, second visual data indicative of the unauthorized participant based at least in part on detection of the unauthorized participant.

According to another example embodiment, one or more computer-readable media that can store instructions that, when executed by one or more processors of a computing device, can cause the computing device to perform operations. The operations can include defining, in a chat view associated with a video chat session, a chat zone indicative of a reference location of a participant in the video chat session. The operations can further include determining that the participant moved outside the chat zone. The operations can further include concealing, in the chat view, visual data indicative of the participant based at least in part on determination that the participant moved outside the chat zone.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
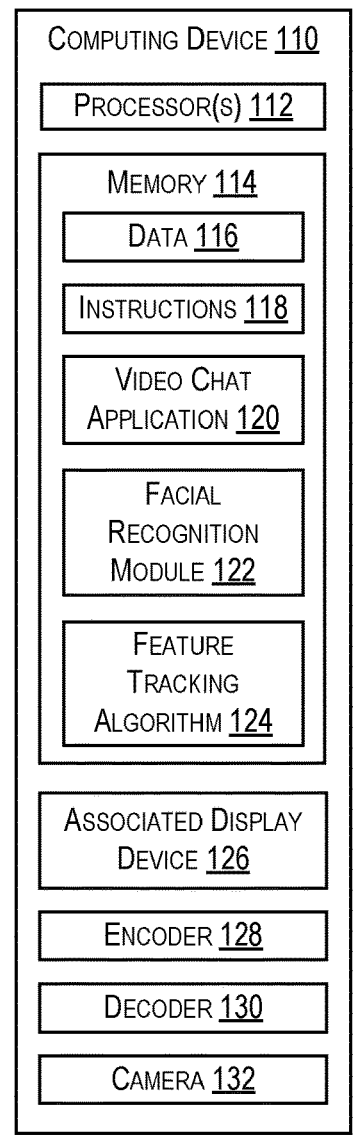
FIG. 1 illustrates a block diagram of an example, non-limiting device according to one or more example embodiments of the present disclosure.

Repeated use of reference characters and/or numerals in the present specification and/or figures is intended to represent the same or analogous features, elements, or operations of the present disclosure. Repeated description of reference characters and/or numerals that are repeated in the present specification is omitted for brevity.

DETAILED DESCRIPTION

Example aspects of the present disclosure are directed to modifying visual data (e.g., image(s), video) in a chat view associated with a video chat session based at least in part on (e.g., in response to) user identification and/or user movement. More specifically, example embodiments of the present disclosure are directed to modifying visual data (e.g., image(s), video) used to represent a user in a chat view associated with a video chat session based at least in part on: whether the user is an authorized participant (e.g., e.g., an organizer, a host, an invitee) or an unauthorized participant (e.g., a bystander, a person in the background) in the video chat session; and/or whether the user moves away from, or returns to, a defined chat zone (e.g., a defined reference location) during the video chat session.

In one embodiment, a computing device can identify an authorized participant of a video chat session in a chat view associated with the video chat session. In this embodiment, the computing device can also detect an unauthorized participant of the video chat session in the chat view. In this embodiment, the computing device can further render, in the chat view, visual data indicative of the authorized participant and conceal, in the chat view, other visual data indicative of the unauthorized participant based at least in part on identifying and detecting, respectively, the authorized participant and the unauthorized participant.

In another embodiment, a computing device can define, in a chat view associated with a video chat session, a chat zone that can be indicative of a reference location of a participant (e.g., an authorized participant) in the video chat session. In this embodiment, the computing device can further determine that the participant moved outside the chat zone and conceal, in the chat view, visual data indicative of the participant based at least in part on determining that the participant moved outside the chat zone.

In yet another embodiment, a computing device can identify multiple authorized participants in a chat view associated with a video chat session and render, in the chat view, visual data indicative of each of the authorized participants based at least in part on identifying the authorized participants. In this embodiment, the computing device can further define, in the chat view, a chat zone indicative of a reference location of one of the authorized participants. In this embodiment, the computing device can further determine that the authorized participant moved outside such a chat zone and conceal, in the chat view, visual data indicative of the authorized participant based at least in part on determining that the authorized participant moved outside the chat zone.

Example aspects of the present disclosure provide several technical effects, benefits, and/or improvements in computing technology. For instance, in example embodiments, by concealing, in a chat view of a video chat application used to implement a video chat session, visual data such as, for example, image(s) and/or video that can be indicative of and/or represent an unauthorized participant (e.g., a bystander), a computing device can thereby conceal the identity of the unauthorized participant from authorized participant(s) participating in the video chat session (e.g., authorized participant(s) participating in the video chat session using such a computing device or another computing device). Additionally, in these or other example embodiments, by concealing such visual data of the unauthorized participant in the chat view as described above, the computing device can thereby further conceal the identity of the unauthorized participant from another unauthorized participant(s) that may be viewing (e.g., with or without permission) the video chat session by way of a chat view rendered on a display, screen, and/or monitor of a computing device used by an authorized participant participating in the video chat session.

Further, in at least one embodiment, a computing device can provide a notification indicating: the detection and/or presence of an unauthorized participant in a chat view associated with a video chat session; and/or the concealment in the chat view of visual data indicative of the unauthorized participant. In this embodiment, the computing device can thereby allow for all authorized participants to be notified and/or aware of the presence of the unauthorized participant. For example, in one embodiment, the computing device can provide such a notification to an authorized participant using the computing device to participate in the video chat session. In another embodiment, the computing device can provide (e.g., via the Internet) such a notification to another computing device (e.g., a laptop, smartphone, tablet) being used by another authorized participant to participate in the video chat session such that the other computing device can provide the notification to the other authorized participant. In some embodiments, by providing such a notification to the authorized participants of a video chat session, the computing device can thereby facilitate providing notice of the unauthorized participant to such authorized participants, where any of the authorized participants may then modify, if desired, the content they contribute during the video chat session based on the presence of the unauthorized participant.

In addition, a computing device according to example embodiments described herein can apply a relatively low resolution to visual data corresponding to and/or representing an unauthorized participant appearing in a chat view to conceal such visual data in the chat view. In these embodiments, by applying a relatively low resolution to such visual data corresponding to and/or representing the unauthorized participant, the computing device can thereby reduce computational and/or bandwidth costs, as well as reduce latency (e.g., delayed images, video) associated with one or more computing resources used to facilitate a video chat session (e.g., a video conference). For example, by applying a relatively low resolution to such visual data corresponding to and/or representing an unauthorized participant, the computing device according to example embodiments can thereby reduce computational and/or bandwidth costs, as well as reduce latency (e.g., delayed images, video) associated with generating, managing (e.g., storing), and/or communicating such visual data having a relatively low resolution (e.g., as compared to costs and/or latency associated with generating, managing (e.g., storing), and/or communicating visual data having a relatively high resolution). For instance, the computing device according to example embodiments can thereby reduce the computational and/or bandwidth costs, as well as reduce latency associated with one or more, for example, processors, memory devices, encoders (e.g., video encoders), decoders (e.g., video decoders), wired and/or wireless network interface components, wired and/or wireless network communication components, displays, monitors, screens, and/or another computing resource associated with the computing device and/or another computing device that can be used to facilitate a video chat session (e.g., a video conference) in accordance with example embodiments described herein.

As referenced herein, the term "video chat session" describes any type of video call, video conference, and/or web conference (e.g., telepresence video conferencing, integrated video conferencing, desktop video conferencing, service-based video conferencing). As referenced herein, the term "chat view" describes the location in a video chat user interface of a video chat application where visual data such as, for instance, image(s) and/or video of the video chat session are rendered for viewing.

As referenced herein, the term "authorized participant" of a video chat session describes a user that is an intended participant, attendee, and/or invitee of the video chat session (e.g., a recipient of an invitation or a request to join the video chat session) and/or a user that serves a certain function or role in the video chat session (e.g., an organizer, host, and/or initiator of the video chat session). As referenced herein, the term "unauthorized participant" of a video chat session describes a user that is not an intended participant or attendee of the video chat session (e.g., a bystander located proximate to an authorized participant in a video chat session such that the bystander appears in images and/or video rendered in a chat view associated with the video chat session).

As referenced herein, the term "chat zone" describes a certain area in a chat view that corresponds to and/or is indicative of a certain location in the physical, real world where the participant is located. In example embodiments described herein, the participant's chat zone can correspond to and/or be indicative of a reference location and/or reference orientation of the participant in the physical, real world. As referenced herein, the term "reference location" and/or "reference orientation" of the participant describes a benchmark location and/or a benchmark orientation of the participant, respectively.

As referenced herein, the term "entity" refers to a human, a user, an end-user, a consumer, a computing device and/or program (e.g., a processor, computing hardware and/or software, an application, etc.), an agent, a machine learning (ML) and/or artificial intelligence (AI) algorithm, model, system, and/or application, and/or another type of entity that can implement and/or facilitate implementation of example embodiments of the present disclosure as described herein, illustrated in the accompanying drawings, and/or included in the appended claims. As referred to herein, the terms "includes" and "including" are intended to be inclusive in a manner similar to the term "comprising." As referenced herein, the terms "or" and "and/or" are generally intended to be inclusive, that is (i.e.), "A or B" or "A and/or B" are each intended to mean "A or B or both."

As referred to herein, the terms "first," "second," "third," and so on, can be used interchangeably to distinguish one component or entity from another and are not intended to signify location, functionality, or importance of the individual components or entities. As referenced herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling.

Approximating language, as used herein throughout the specification, the appended claims, and/or the accompanying drawings is applied to modify any quantitative representation that could permissibly vary without resulting in a change in the basic function to which it is related. Accordingly, a value modified by a term or terms, such as "about," "approximately," and/or "substantially," are not to be limited to the precise value specified. In some embodiments, the approximating language can correspond to the precision of an instrument for measuring the value. For example, the approximating language can refer to being within a 10 percent (%) margin. For instance, as used herein, the term or terms "about," "approximately," and/or "substantially" in conjunction with a numerical value can refer to within 10% of the indicated numerical value.

According to example embodiments of the present disclosure, a computing device such as, for instance, computing device 110 described below with reference to the example embodiments depicted in FIGS. 1 and 2, can facilitate modification of visual data (e.g., image(s), video) in a chat view associated with a video chat session based at least in part on (e.g., in response to) user identification and/or user movement. Such a computing device according to example embodiments described herein can include, be coupled to (e.g., communicatively, operatively), and/or otherwise be associated with one or more processors and/or one or more non-transitory computer-readable storage media. In these or other embodiments, the one or more non-transitory computer-readable storage media can store instructions that, when executed by the processor(s), can cause the computing device to perform one or more operations described herein to facilitate modification of visual data (e.g., image(s), video) in a chat view associated with a video chat session based at least in part on (e.g., in response to) user identification and/or user movement.

In some embodiments, the above-described computing device (e.g., computing device 110) can further include, be coupled to (e.g., communicatively, operatively), and/or otherwise be associated with a camera that can capture image and/or video data (e.g., image(s), video) of a video chat session that can be rendered (e.g., by the computing device or another computing device) in a chat view of a video chat user interface. In some embodiments, the computing device can further include, be coupled to (e.g., communicatively, operatively), and/or otherwise be associated with a microphone and/or a speaker, where the microphone can capture audio data of a video chat session that can be played aloud (e.g., by the computing device) using the speaker.

In accordance with example embodiments of the present disclosure, to facilitate modification of visual data (e.g., image(s), video) in a chat view associated with a video chat session based at least in part on (e.g., in response to) user identification, the above-described computing device (e.g., computing device 110) can, in one embodiment: identify, in a chat view associated with a video chat session, an authorized participant of the video chat session; and/or detect, in the chat view, an unauthorized participant of the video chat session. In this or another embodiment, the computing device can further: render, in the chat view, first visual data (e.g., image(s), video) indicative of the authorized participant based at least in part on (e.g., in response to) identification of the authorized participant; and/or conceal, in the chat view, second visual data (e.g., image(s), video) indicative of the unauthorized participant based at least in part on (e.g., in response to) detection of the unauthorized participant.

To facilitate identification of an authorized participant appearing in the chat view, the computing device according to example embodiments described herein can perform a face calibration process using a facial recognition module to authenticate the authorized participant as a participant of the video chat session. For example, to perform such a face calibration process, the computing device according to example embodiments of the present disclosure can use a camera to capture image and/or video data (e.g., image(s), video) of an authorized participant of the video chat session. In these or other embodiments, the computing device can further implement a facial recognition module such as, for instance, a machine learning and/or a face matching algorithm and/or model that can use such captured image and/or video data to generate face embedding(s) and/or feature vector(s) that can represent, correspond to, and/or be indicative of the authorized participant.

In one embodiment, the computing device can perform the above-described face calibration process upon installation and/or configuration (e.g., setup) of a video chat application that can run (e.g., be executed) on the computing device. In another embodiment, the computing device can perform the face calibration process upon initiation and/or commencement of (e.g., at the start of) the video chat session. In another embodiment, the computing device can perform the face calibration process during the video chat session (e.g., when an authorized participant joins a video chat session that is already in progress).

In some embodiments, the computing device can store (e.g., temporarily or permanently in a database and/or memory) and/or subsequently reference (e.g., access) the above-described face embedding(s) and/or feature vector(s) corresponding to the authorized participant to authenticate and/or identify the authorized participant as an intended participant and/or invitee of the video chat session. For example, in these or other embodiments, after completing the above-described face calibration process, when the computing device detects an entity (e.g., a human) appearing in the chat view, the computing device can generate (e.g., via the above-described facial recognition module) face embedding(s) and/or feature vector(s) that can represent, correspond to, and/or be indicative of the entity. In these or other embodiments, the computing device can further compare (e.g., via the above-described facial recognition module) such face embedding(s) and/or feature vector(s) corresponding to the entity with the face embedding(s) and/or feature vector(s) corresponding to the authorized participant. In these or other embodiments, if the computing device determines that the face embedding(s) and/or feature vector(s) corresponding to the entity match the face embedding(s) and/or feature vector(s) corresponding to the authorized participant, the computing device can thereby determine that the entity is the authorized participant of the video chat session.

To detect the unauthorized participant appearing in the chat view, the computing device according to example embodiments described herein can implement the above-described facial recognition module (e.g., a machine learning and/or a face matching algorithm and/or model) and/or utilize the above-described face embedding(s) and/or feature vector(s) corresponding to the authorized participant. For example, in these or other embodiments, after completing the above-described face calibration process, when the computing device detects an entity (e.g., a human) appearing in the chat view, the computing device can generate (e.g., via the above-described facial recognition module) face embedding(s) and/or feature vector(s) that can represent, correspond to, and/or be indicative of the entity. In these or other embodiments, the computing device can further compare (e.g., via the above-described facial recognition module) such face embedding(s) and/or feature vector(s) corresponding to the entity with the face embedding(s) and/or feature vector(s) corresponding to the authorized participant. In these or other embodiments, if the computing device determines that the face embedding(s) and/or feature vector(s) corresponding to the entity do not match the face embedding(s) and/or feature vector(s) corresponding to the authorized participant, the computing device can thereby determine that the entity is an unauthorized participant of the video chat session.

As described above, based at least in part on (e.g., in response to) identifying the authorized participant and/or detecting the unauthorized participant in the chat view, the computing device according to example embodiments can: render, in the chat view, first visual data (e.g., image(s), video) indicative of the authorized participant; and/or conceal, in the chat view, second visual data (e.g., image(s), video) indicative of the unauthorized participant. For example, in at least one embodiment, the computing device can render the first visual data indicative of the authorized participant in a foreground section (e.g., the foreground, front) of the chat view and/or conceal the second visual data indicative of the unauthorized participant in a background section (e.g., the background, back) of the chat view.

As referenced herein, the term "foreground section" or "foreground" of the chat view describes an area (e.g., a front area) in the chat view that renders visual data (e.g., image and/or video data such as, for instance, image(s), video) of entities (e.g., humans, objects) that are located relatively closer than other entities in the chat view to a camera used to capture such visual data (e.g., image and/or video data, image(s), video) during the video chat session. As referenced herein, the term "background section" or "background" of the chat view describes an area (e.g., a back area) in the chat view that renders visual data (e.g., image and/or video data such as, for instance, image(s), video) of entities (e.g., humans, objects) that are located relatively farther than other entities in the chat view from a camera used to capture such visual data (e.g., image and/or video data, image(s), video) during the video chat session.

In some embodiments, based at least in part on (e.g., in response to) identifying the authorized participant in the chat view, the computing device can render (e.g., visually display) image(s) and/or video of the authorized participant in the chat view (e.g., in the foreground of the chat view) such that the image(s) and/or video have a first defined resolution (e.g., relatively high resolution) that allows the authorized participant to be a focal point of the chat view. In some embodiments, based at least in part on (e.g., in response to) detecting the unauthorized participant in the chat view, the computing device can conceal (e.g., visually mask, hide) image(s) and/or video of the unauthorized participant in the chat view (e.g., in the background of the chat view) such that the image(s) and/or video have a second defined resolution (e.g., relatively low resolution that is less than the above-described first defined resolution) that allows the unauthorized participant to be blurred, merged into, blended in with, painted into, and/or otherwise be concealed in the chat view (e.g., in the background of the chat view).

According to example embodiments described herein, based at least in part on (e.g., in response to) detecting the unauthorized participant in the chat view, the computing device can provide a notification indicating the detection and/or presence of the unauthorized participant and/or the concealment in the chat view of the second visual data (e.g., image(s), video) indicative of the unauthorized participant. For example, in one embodiment, upon detecting the unauthorized participant in the chat view, the computing device can render (e.g., as a text message, a visual indicator) such a notification and/or data indicative of the notification in the chat view and/or at another location on a display, screen, and/or monitor that can be included in, coupled to (e.g., communicatively, operatively), and/or otherwise associated with the computing device. In another embodiment, upon detecting the unauthorized participant in the chat view, the computing device can provide such a notification as an audio message that can be played aloud using a speaker that can be included in, coupled to (e.g., communicatively, operatively), and/or otherwise associated with the computing device.

In some embodiments, the computing device can provide the above-described notification to another computing device (e.g., a remote and/or external computing device) being used by another authorized participant to participate in the video chat session. For example, in these embodiments, the computing device can provide the notification to the other computing device such that the other authorized participant can be notified of the detection and/or presence of the unauthorized participant and/or the concealment in the chat view of the second visual data (e.g., image(s), video) indicative of the unauthorized participant. In these embodiments, the computing device can use a wired and/or wireless network (e.g., the Internet) to provide the notification to another computing device such as, for instance, a client computing device, a computer, a laptop, a cellular phone, a smartphone, a tablet, a wearable computing device (e.g., smart glasses, smart watch), and/or another computing device.

In one embodiment, the computing device can provide (e.g., via the Internet) the above-described notification to another computing device described above in a format (e.g., a text file, text message, electronic mail message) that allows that other computing device to render (e.g., as a text message, a visual indicator) the notification and/or data indicative of the notification in a chat view (e.g., of a video chat application running on that other computing device) and/or at another location on a display, screen, and/or monitor that can be included in, coupled to (e.g., communicatively, operatively), and/or otherwise associated with that other computing device. In another embodiment, the computing device can provide (e.g., via the Internet) the notification to the other computing device in the format of an audio message (e.g., an audio file) that can be played aloud using a speaker that can be included in, coupled to (e.g., communicatively, operatively), and/or otherwise associated with that other computing device.

In accordance with at least one embodiment of the present disclosure, the computing device can: identify, in the chat view, a second authorized participant of the video chat session; and/or render, in the chat view, third visual data (e.g., image(s), video) indicative of the second authorized participant based at least in part on identification of the second authorized participant. In example embodiments, the computing device can identify the second authorized participant in a background section of the chat view or a foreground section of the chat view. In these example embodiments, the computing device can further render the third visual data indicative of the second authorized participant in the background section of the chat view or the foreground section of the chat view based at least in part on identification of the second authorized participant.

To facilitate identification of the second authorized participant in the chat view, the computing device according to example embodiments can implement the above-described face calibration process (e.g., at the start of the video chat session) using the above-described facial recognition module (e.g., a machine learning and/or a face matching algorithm and/or model) to authenticate the second authorized participant as an intended participant and/or invitee of the video chat session. In these or other embodiments, the computing device can further implement the facial recognition module to subsequently identify the second authorized participant in the chat view. For example, the computing device according to example embodiments can use a camera to capture image and/or video data (e.g., image(s), video) of the second authorized participant and use such captured image and/or video data to generate (e.g., via the above-described facial recognition module) face embedding(s) and/or feature vector(s) that can represent, correspond to, and/or be indicative of the second authorized participant. In these embodiments, the computing device can store (e.g., temporarily or permanently in a database and/or memory) and/or subsequently reference (e.g., access) the face embedding(s) and/or feature vector(s) corresponding to the second authorized participant to authenticate and/or identify (e.g., via the above-described facial recognition module) the second authorized participant as an intended participant and/or invitee of the video chat session.

As an example, in one embodiment, prior to detecting the second authorized participant in the chat view, the computing device can perform the above-described face calibration process (e.g., at the start of the video chat session) using the above-described facial recognition module to authenticate the second authorized participant as an intended participant and/or invitee of the video chat session. In this or another embodiment, after completing the face calibration process, the second authorized participant may temporarily leave the chat view (e.g., may move outside the camera view) and subsequently return to a location that is in the background section of the chat view. In this or another embodiment, when the second authorized participant returns to the location that is in the background section of the chat view, the computing device can implement the above-described facial recognition module to identify the second authorized participant as described above and/or render the third visual data (e.g., image(s), video) indicative of the second authorized participant in the background section or the foreground section of the chat view.

In some embodiments, based at least in part on (e.g., in response to) identifying the second authorized participant in the chat view (e.g., in the background or the foreground) as described above, the computing device can render (e.g., visually display) image(s) and/or video of the second authorized participant in the chat view (e.g., in the background or the foreground) such that the image(s) and/or video of the second authorized participant have the above-described first defined resolution (e.g., relatively high resolution) that allows the second authorized participant to be a focal point of the chat view. For example, in one embodiment, based at least in part on (e.g., in response to) identifying the second authorized participant in the background of the chat view, the computing device can render the image(s) and/or video of the second authorized participant in the background of the chat view such that the image(s) and/or video of the second authorized participant have the above-described first defined resolution (e.g., relatively high resolution) that allows the second authorized participant to be an additional focal point of the chat view along with the primary authorized participant previously identified in the chat view.

In some embodiments, during the video chat session or upon termination (e.g., completion) of the video chat session, the computing device can delete (e.g., from a database, memory) any face embedding(s) and/or feature vector(s) that were generated for and correspond to any authorized participant (e.g., the authorized participant and/or the second authorized participant described above). In some embodiments, upon determination that an entity appearing in the chat view is an unauthorized participant and/or upon termination (e.g., completion) of the video chat session, the computing device can delete (e.g., from a database, memory) the face embedding(s) and/or feature vector(s) that were generated for and correspond to such an entity.

In some embodiments, upon termination (e.g., completion) of the video chat session, the computing device can keep (e.g., in a database, memory) any face embedding(s) and/or feature vector(s) that were generated for and correspond to any authorized participant (e.g., the authorized participant and/or the second authorized participant described above). For instance, in one embodiment, the computing device can keep (e.g., in a database, memory) such face embedding(s) and/or feature vector(s) for future use with a subsequent video chat session (e.g., a subsequent video chat session having the same or different video chat participants and/or invitees as a current video chat session).

In some embodiments, an authorized participant (e.g., the authorized participant and/or the second authorized participant described above) can instruct (e.g., via a user interface, keyboard, voice command, touchscreen) the computing device to keep (e.g., in a database, memory) any face embedding(s) and/or feature vector(s) that were generated for and correspond to such an authorized participant. For instance, in one embodiment, such an authorized participant can instruct the computing device to keep (e.g., in a database, memory) such face embedding(s) and/or feature vector(s) for future use with a subsequent video chat session (e.g., a subsequent video chat session having the same or different video chat participants and/or invitees as a current video chat session).

In some embodiments, the computing device can provide to and/or receive from another computing device (e.g., a remote and/or external computing device) any face embedding(s) and/or feature vector(s) that were generated for and correspond to any authorized participant (e.g., the authorized participant and/or the second authorized participant described above). For example, in these embodiments, the computing device can use a wired and/or wireless network (e.g., the Internet) to communicate (e.g., provide and/or receive) such face embedding(s) and/or feature vector(s) with another computing device such as, for instance, a client computing device, a computer, a laptop, a cellular phone, a smartphone, a tablet, a wearable computing device (e.g., smart glasses, smart watch), and/or another computing device.

In one embodiment, the computing device can provide face embedding(s) and/or feature vector(s) to another, remote computing device that can then use them in accordance with example embodiments of the present disclosure to authenticate and/or identify an authorized participant to whom the face embedding(s) and/or feature vector(s) correspond. For example, in this or another embodiment, at the start of a video chat session, the computing device can generate face embedding(s) and/or feature vector(s) that correspond to a certain authorized participant and then send them (e.g., via a wired and/or wireless network) to the remote computing device. In this or another embodiment, such an authorized participant can then use the remote computing device to participate in the video chat session, where the remote computing device can use the face embedding(s) and/or feature vector(s) corresponding to the authorized participant to identify the authorized participant in a chat view as described herein according to example embodiments.

In another embodiment, the computing device can receive such face embedding(s) and/or feature vector(s) from another, remote computing device and the computing device can then use them in accordance with example embodiments of the present disclosure to authenticate and/or identify an authorized participant to whom the face embedding(s) and/or feature vector(s) correspond. For example, in this or another embodiment, at the start of a video chat session, the remote computing device can generate face embedding(s) and/or feature vector(s) that correspond to a certain authorized participant and then send them (e.g., via a wired and/or wireless network) to the computing device. In this or another embodiment, such an authorized participant can then use the computing device to participate in the video chat session, where the computing device can use the face embedding(s) and/or feature vector(s) that were generated by the remote computing device and correspond to the authorized participant to identify the authorized participant in a chat view as described herein according to example embodiments.

In accordance with example embodiments of the present disclosure, to facilitate modification of visual data (e.g., image(s), video) in a chat view associated with a video chat session based at least in part on (e.g., in response to) user movement, the above-described computing device (e.g., computing device 110) can, in one embodiment: define, in a chat view associated with a video chat session, a chat zone that can be indicative of a reference location of a participant (e.g., the above-described authorized participant) in the video chat session; determine that the participant moved outside the chat zone; and/or conceal, in the chat view, visual data (e.g., image(s), video) indicative of the participant based at least in part on (e.g., in response to) determination that the participant moved outside the chat zone. In some embodiments, the computing device can further: determine that the participant returned to the chat zone; and/or render, in the chat view, the visual data (e.g., image(s), video) indicative of the participant based at least in part on (e.g., in response to) determination that the participant returned to the chat zone.

In at least one embodiment described herein, the above-described chat zone that can be indicative of a reference location of the participant can be defined, for instance, selected and/or chosen by the participant when implementing a chat zone calibration process described below (e.g., the participant can choose to stand or sit at a certain location and/or with a certain orientation and/or posture during the chat zone calibration process described below). In some embodiments, the participant's chat zone and/or reference location can be a certain location, orientation, and/or posture of the participant that the participant usually occupies during a video chat session (e.g., a location centered in the foreground of the chat view). In some embodiments, the participant's chat zone and/or reference location can be a location, orientation, and/or posture of the participant that the participant does not usually occupy during a video chat session (e.g., a location along the perimeter and/or in the background of the chat view).

To define the above-described chat zone that can be indicative of a reference location of the participant, the computing device according to example embodiments can perform a chat zone calibration process as described below using a facial recognition module and/or a feature tracking algorithm to define the participant's chat zone in the chat view based at least in part on reference key point data and/or a reference feature vector that can correspond to the participant. In these or other embodiments, such reference key point data and/or reference feature vector can be descriptive of the participant and/or indicative of the participant being positioned at the reference location. As such, in these or other embodiments, the participant's reference key point data and/or reference feature vector can correspond to, constitute, and/or be indicative of the participant's chat zone and/or reference location, and can thereby serve to define and/or represent the participant's chat zone and/or reference location.

To perform the chat zone calibration process, the computing device according to example embodiments of the present disclosure can use a camera to capture image and/or video data (e.g., image(s), video) of a participant (e.g., the above-described authorized participant) of the video chat session while the participant maintains a certain positioned, orientation, and/or posture at a certain location. In these or other embodiments, the participant can choose to stand or sit at a certain location and/or with a certain orientation and/or posture while the camera is capturing such image and/or video data of the participant, and as such, the participant can thereby define the participant's chat zone and/or reference location. In these or other embodiments, the computing device can further implement a facial recognition module (e.g., a machine learning and/or a face matching algorithm and/or model) and/or a feature tracking algorithm (e.g., the Kanade-Lucas-Tomasi (KLT) algorithm) that can use such captured image and/or video data to learn the participant's skeletal key points at the participant's reference location.

In some embodiments, the participant's reference location skeletal key points can constitute the participant's reference key point data that can be descriptive of the participant and/or indicative of the participant being positioned at the reference location. In these or other embodiments, the computing device can further implement the facial recognition module and/or feature tracking algorithm to compute (e.g., calculate) a reference feature vector that can include, constitute, and/or be indicative of reference distances between at least some of the skeletal key points in the participant's reference key point data. Therefore, in these or other embodiments, the participant's reference key point data and/or reference feature vector can be descriptive of the participant and/or indicative of the participant being positioned at the reference location.

In one embodiment, the computing device can perform the above-described chat zone calibration process upon installation and/or configuration (e.g., setup) of a video chat application that can run (e.g., be executed) on the computing device. In another embodiment, the computing device can perform the chat zone calibration process upon initiation and/or commencement of (e.g., at the start of) the video chat session. In another embodiment, the computing device can perform the chat zone calibration process during the video chat session (e.g., when a participant joins a video chat session that is already in progress).

In some embodiments, the computing device can store (e.g., temporarily or permanently in a database and/or memory) and/or subsequently reference (e.g., access) the participant's reference key point data and/or reference feature vector to determine whether the participant has moved outside of or returned to the participant's chat zone and/or reference location. For example, in these or other embodiments, after completing the above-described chat zone calibration process, the computing device can perform a pose estimation process during a video chat session using the above-described feature tracking algorithm (e.g., KLT algorithm) to track the participant as the participant moves within the participant's chat zone and/or within the chat view. In these or other embodiments, by using such a feature tracking algorithm to track the participant's movements during the video chat session, the computing device can obtain (e.g., observe, compute) runtime data that can describe, correspond to, and/or be indicative of the participant being positioned and/or oriented at one or more locations that are different from the participant's chat zone and/or reference location.

To perform the above-described pose estimation process, the computing device according to example embodiments can use the above-described facial recognition module and/or feature tracking algorithm (e.g., KLT algorithm) to periodically (e.g., every ½ second, every second) and/or continuously determine (e.g., learn, observe) the participant's runtime key point data (e.g., current key point data) and/or to compute (e.g., calculate) the participant's runtime feature vector (e.g., current feature vector) as the participant moves during the video chat session. In these or other embodiments, the computing device can further use the facial recognition module and/or feature tracking algorithm during the video chat session to compare the participant's runtime key point data and/or runtime feature vector with the participant's reference key point data and/or reference feature vector to determine whether there is a difference between such runtime and reference data that exceeds a defined threshold value (e.g., a pre-defined threshold value).

In some embodiments, the computing device can compare runtime distances between key points of the participant's runtime key point data with reference distances between key points of the participant's reference key point data to determine whether a difference between one of the runtime distances and one of the reference distances exceeds a defined threshold value (e.g., a pre-defined distance and/or percentage value). For instance, in example embodiments, the participant's reference feature vector can include, constitute, and/or be indicative of reference distances between at least some of the skeletal key points in the participant's reference key point data. Similarly, in these embodiments, the participant's runtime feature vector can include, constitute, and/or be indicative of runtime distances between at least some of the skeletal key points in the participant's runtime key point data. In these embodiments, the computing device can use the facial recognition module and/or feature tracking algorithm to compare at least one of such runtime distances with at least one of such reference distances to determine whether a difference between such distances exceeds a defined threshold value, where such a determination can indicate that the participant has moved outside of the participant's chat zone and/or reference location.

In one embodiment, if the computing device determines (e.g., using the KLT algorithm) that a certain runtime distance is shorter than a certain corresponding reference distance and further determines that the difference in distance exceeds (e.g., is greater than) a certain pre-defined distance value, then the computing device can thereby determine that the participant has moved outside of the participant's chat zone and/or reference location. In another embodiment, if the computing device determines (e.g., using the KLT algorithm) that the runtime distance is shorter than the corresponding reference distance by a certain percentage (e.g., 50 percent) of the corresponding reference distance, then the computing device can thereby determine that the participant has moved outside of the participant's chat zone and/or reference location.

In at least one embodiment of the present disclosure, based at least in part on (e.g., in response to) determining that the participant moved outside the participant's chat zone and/or reference location, the computing device can conceal, in the chat view, visual data (e.g., image(s), video) indicative of the participant. For example, in this or another embodiment, the computing device can conceal (e.g., visually mask, hide) image(s) and/or video of the participant in the chat view (e.g., in the background of the chat view) such that the image(s) and/or video have the above-described second defined resolution (e.g., relatively low resolution that is less than the above-described first defined resolution) that allows the participant to be blurred, merged into, blended in with, painted into, and/or otherwise be concealed in the chat view (e.g., in the background of the chat view).

In at least one embodiment of the present disclosure, the computing device can further implement the facial recognition module and/or feature tracking algorithm and the participant's above-described reference distances and runtime distances to determine that the participant has returned to the participant's chat zone and/or reference location. In this embodiment, the computing device can use the facial recognition module and/or feature tracking algorithm to compare at least one of such runtime distances with at least one of such reference distances to determine whether a difference between such distances is less than a defined threshold value, where such a determination can indicate that the participant has returned to the participant's chat zone and/or reference location.

In one embodiment, if the computing device determines (e.g., using the KLT algorithm) that a certain runtime distance is approximately equal to or shorter than a certain corresponding reference distance and further determines that the difference in distance is less than a certain pre-defined distance value, then the computing device can thereby determine that the participant has returned to the participant's chat zone and/or reference location. In another embodiment, if the computing device determines (e.g., using the KLT algorithm) that the runtime distance is approximately equal to or shorter than the corresponding reference distance by a certain percentage (e.g., 5 percent) of the corresponding reference distance, then the computing device can thereby determine that the participant has returned to the participant's chat zone and/or reference location.

In at least one embodiment of the present disclosure, based at least in part on (e.g., in response to) determining that the participant returned to the participant's chat zone and/or reference location, the computing device can render, in the chat view, visual data (e.g., image(s), video) indicative of the participant. For example, in this or another embodiment, the computing device can render (e.g., visually display) image(s) and/or video of the participant in the chat view (e.g., in the foreground of the chat view) such that the image(s) and/or video have the above-described first defined resolution (e.g., relatively high resolution) that allows the participant to be a focal point of the chat view.

In accordance with example embodiments of the present disclosure, to facilitate modification of visual data (e.g., image(s), video) in a chat view associated with a video chat session based at least in part on (e.g., in response to) user identification and user movement, the above-described computing device (e.g., computing device 110) can, in one embodiment: identify, in a chat view associated with a video chat session, a first authorized participant and a second authorized participant of the video chat session; render, in the chat view, first visual data (e.g., image(s), video) indicative of the first authorized participant and second visual data (e.g., image(s), video) indicative of the second authorized participant based at least in part on (e.g., in response to) identification of the first authorized participant and the second authorized participant, respectively; define, in the chat view, a chat zone indicative of a reference location of the first authorized participant; determine that the first authorized participant moved outside the chat zone; and/or conceal, in the chat view, the first visual data (e.g., image(s), video) indicative of the first authorized participant based at least in part on (e.g., in response to) determination that the first authorized participant moved outside the chat zone.

To facilitate identification of the first authorized participant and/or the second authorized participant appearing in the chat view, the computing device according to example embodiments described herein can perform the above-described face calibration process using the facial recognition module described above to respectively authenticate the first authorized participant and/or the second authorized participant as a participant of the video chat session. For example, in at least one embodiment, the computing device can generate face embedding(s) and/or feature vector(s) as described above that can respectively represent, correspond to, and/or be indicative of the first authorized participant and/or the second authorized participant. In this or another embodiment, the computing device can store (e.g., temporarily or permanently in a database and/or memory) and/or subsequently reference (e.g., access) such face embedding(s) and/or feature vector(s) to identify the first authorized participant and/or the second authorized participant in the chat view as described above.

In at least one embodiment of the present disclosure, based at least in part on (e.g., in response to) identification of the first authorized participant and/or the second authorized participant, the computing device can render, in the chat view, the first visual data (e.g., image(s), video) indicative of the first authorized participant and/or the second visual data (e.g., image(s), video) indicative of the second authorized participant. In this or another embodiment, the computing device can render (e.g., visually display) image(s) and/or video of the first authorized participant in the chat view (e.g., in the foreground of the chat view) such that the image(s) and/or video have the above-described first defined resolution (e.g., relatively high resolution) that allows the first authorized participant to be a focal point of the chat view. In this or another embodiment, the computing device can render (e.g., visually display) image(s) and/or video of the second authorized participant in the chat view (e.g., in the foreground or the background of the chat view) such that the image(s) and/or video have the above-described first defined resolution (e.g., relatively high resolution) that allows the second authorized participant to be an additional focal point of the chat view along with the first authorized participant.

To define the chat zone that can be indicative of a reference location of the first authorized participant, the computing device according to example embodiments can perform the above-described chat zone calibration process using a facial recognition module and/or a feature tracking algorithm to define the first authorized participant's chat zone in the chat view based at least in part on reference key point data and/or a reference feature vector that can correspond to the first authorized participant. In some embodiments, the computing device can store (e.g., temporarily or permanently in a database and/or memory) and/or subsequently reference (e.g., access) the first authorized participant's reference key point data and/or reference feature vector to determine whether the first authorized participant has moved outside of or returned to the first authorized participant's chat zone and/or reference location.

In some embodiments, after completing the chat zone calibration process, the computing device can perform the above-described pose estimation process during a video chat session using the above-described feature tracking algorithm (e.g., KLT algorithm) to track the first authorized participant as the first authorized participant moves within the first authorized participant's chat zone and/or within the chat view. In these or other embodiments, the computing device can further use the feature tracking algorithm during the video chat session as described above to compare the first authorized participant's runtime key point data and/or runtime feature vector with the first authorized participant's reference key point data and/or reference feature vector to determine whether there is a difference between such runtime and reference data that indicates whether the first authorized participant has moved outside of or returned to the first authorized participant's chat zone and/or reference location.

In at least one embodiment of the present disclosure, based at least in part on (e.g., in response to) determining that the first authorized participant moved outside the first authorized participant's chat zone and/or reference location, the computing device can conceal, in the chat view, the first visual data (e.g., image(s), video) indicative of the first authorized participant. For example, in this or another embodiment, the computing device can conceal (e.g., visually mask, hide) image(s) and/or video of the first authorized participant in the chat view (e.g., in the background of the chat view) such that the image(s) and/or video have the above-described second defined resolution (e.g., relatively low resolution that is less than the above-described first defined resolution) that allows the first authorized participant to be blurred, merged into, blended in with, painted into, and/or otherwise be concealed in the chat view (e.g., in the background of the chat view).

In some embodiments, the computing device can maintain, in the chat view, rendition of the second visual data (e.g., image(s), video) indicative of the second authorized participant based at least in part on (e.g., in response to) the determination that the first authorized participant moved outside the first authorized participant's chat zone and/or reference location. That is, for instance, in these or other embodiments, based at least in part on (e.g., in response to) the determination that the first authorized participant moved outside the first authorized participant's chat zone and/or reference location, the computing device can conceal (e.g., visually mask, hide), in the chat view (e.g., in the background of the chat view), the first visual data (e.g., image(s), video) indicative of the first authorized participant while continuing to render (e.g., visually display), in the chat view (e.g., in the background or the foreground of the chat view), the second visual data (e.g., image(s), video) indicative of the second authorized participant. For example, in these or other embodiments, the computing device can conceal (e.g., visually mask, hide), in the chat view (e.g., in the background of the chat view), image(s) and/or video of the first authorized participant while continuing to render (e.g., visually display), in the chat view (e.g., in the background or the foreground of the chat view), image(s) and/or video of the second authorized participant.

In example embodiments, the computing device can detect, in the chat view, an unauthorized participant of the video chat session. To detect the unauthorized participant appearing in the chat view, the computing device according to example embodiments described herein can implement the facial recognition module as described above using the face embedding(s) and/or feature vector(s) that respectively correspond to the first authorized participant and/or the second authorized participant. For example, in these or other embodiments, the computing device can determine (e.g., using the facial recognition module) that face embedding(s) and/or feature vector(s) corresponding to the unauthorized participant do not match the face embedding(s) and/or feature vector(s) that respectively correspond to the first authorized participant and the second authorized participant. In these or other embodiments, based at least in part on (e.g., in response to) such a determination, the computing device can thereby determine that the unauthorized participant is not an intended participant and/or invitee of the video chat session.

In some embodiments, the computing device can conceal, in the chat view, third visual data (e.g., image(s), video) indicative of the unauthorized participant based at least in part on (e.g., in response to) detection of the unauthorized participant. For example, in these or other embodiments, the computing device can conceal (e.g., visually mask, hide) image(s) and/or video of the unauthorized participant in the chat view (e.g., in the background of the chat view) such that the image(s) and/or video have the above-described second defined resolution (e.g., relatively low resolution that is less than the above-described first defined resolution) that allows the unauthorized participant to be blurred, merged into, blended in with, painted into, and/or otherwise be concealed in the chat view (e.g., in the background of the chat view).

According to example embodiments described herein, based at least in part on (e.g., in response to) detecting the unauthorized participant in the chat view, the computing device can provide a notification indicating the detection and/or presence of the unauthorized participant and/or the concealment in the chat view of the third visual data (e.g., image(s), video) indicative of the unauthorized participant. For example, in one embodiment, upon detecting the unauthorized participant in the chat view, the computing device can render such a notification in the chat view and/or at another location on a display, screen, and/or monitor that can be included in, coupled to (e.g., communicatively, operatively), and/or otherwise associated with the computing device. In another embodiment, upon detecting the unauthorized participant in the chat view, the computing device can provide such a notification as an audio message that can be played aloud using a speaker that can be included in, coupled to (e.g., communicatively, operatively), and/or otherwise associated with the computing device.

FIG. 1 illustrates a block diagram of an example, non-limiting device 100 according to one or more example embodiments of the present disclosure. In the example embodiment depicted in FIG. 1, device 100 can constitute, include, be coupled to (e.g., operatively), and/or otherwise be associated with a computing device 110.

As previously specified, computing device 110 can perform the operations described above to facilitate modification of visual data (e.g., image(s), video) in a chat view associated with a video chat session based at least in part on (e.g., in response to) user identification and/or user movement in accordance with example embodiments of the present disclosure. However, for brevity, a repeated, comprehensive description of all of such operations is omitted from the disclosures below that make reference to example embodiments depicted in the accompanying figures.

Computing device 110 according to example embodiments of the present disclosure can constitute, for instance, a client computing device, a computer, a laptop, a cellular phone, a smartphone, a tablet, a wearable computing device (e.g., smart glasses, smart watch), an action camera, a dashboard camera, an omnidirectional camera, and/or another computing device. As illustrated in the example embodiment depicted in FIG. 1, computing device 110 can include one or more processors 112, memory 114, an associated display device 126, an encoder 128, a decoder 130, and/or a camera 132.

Processor(s) 112 according to example embodiments described herein can each be a processing device. For example, in the example embodiment depicted in FIG. 1, processor(s) 112 can each be a central processing unit (CPU), microprocessor, microcontroller, integrated circuit (e.g., an application specific integrated circuit (ASIC)), and/or another type of processing device.

Memory 114 according to example embodiments described herein can store computer-readable and/or computer executable entities (e.g., data, information, applications, models, algorithms) that can be created, modified, accessed, read, retrieved, and/or executed by each of processor(s) 112. In some embodiments, memory 114 can constitute, include, be coupled to (e.g., operatively), and/or otherwise be associated with a computing system and/or media such as, for example, one or more computer-readable media, volatile memory, non-volatile memory, random-access memory (RAM), read only memory (ROM), hard drives, flash drives, and/or other memory devices. In these or other embodiments, such one or more computer-readable media can include, constitute, be coupled to (e.g., operatively), and/or otherwise be associated with one or more non-transitory computer-readable media. In the example embodiment depicted in FIG. 1, memory 114 can include data 116, instructions 118, a video chat application 120, a facial recognition module 122, and/or a feature tracking algorithm 124.

Data 116 according to example embodiments described herein can constitute and/or include, for instance, structured data, unstructured data, application specific data, and/or another type of data. In some embodiments, data 116 can constitute and/or include any type of data described herein that can be generated, managed (e.g., stored), communicated (e.g., over a wired and/or wireless network), and/or utilized (e.g., referenced, ingested as input) in accordance with example embodiments of the present disclosure. In at least one embodiment, data 116 can include data that can be used by computing device 110 to implement (e.g., execute, run), operate, and/or manage video chat application 120, facial recognition module 122, and/or feature tracking algorithm 124 in accordance with example embodiments of the present disclosure.

Although not depicted in the example embodiment illustrated in FIG. 1, data 116 according to example embodiments described herein can include, for instance, the face embedding(s) and/or feature vector(s) (e.g., reference feature vector(s), runtime feature vector(s)) described above that can represent, correspond to, and/or be indicative of an entity such as, for example, an authorized participant or an unauthorized participant of a video chat session. For example, in one embodiment, data 116 can include authorized participant face set 402 described below and illustrated in the example embodiment depicted in FIG. 4.

Additionally, or alternatively, although not depicted in the example embodiment illustrated in FIG. 1, data 116 according to example embodiments described herein can include, for instance, the key point data (e.g., skeletal key points, reference key point data, runtime key point data) described above that can represent, correspond to, and/or be indicative of an entity such as, for example, an authorized participant of a video chat session. For example, in one embodiment, data 116 can include chat zone pose set 404 described below and illustrated in the example embodiment depicted in FIG. 4.

Instructions 118 according to example embodiments described herein can include, for example, any computer-readable and/or computer executable instructions (e.g., software, routines, processing threads) that, when executed by processor(s) 112, cause computing device 110 to perform one or more certain operations. For example, in some embodiments, instructions 118 can include instructions that, when executed by processor(s) 112, can cause computing device 110 to perform operations in accordance with example embodiments described herein to modify visual data (e.g., image(s), video) in a chat view associated with a video chat session based at least in part on (e.g., in response to) user identification and/or user movement.

Video chat application 120, facial recognition module 122, and/or feature tracking algorithm 124 according to example embodiments described herein can each be implemented (e.g., executed, run) by computing device 110 (e.g., via processor(s) 112) to facilitate modification of visual data (e.g., image(s), video) in a chat view associated with a video chat session based at least in part on (e.g., in response to) user identification and/or user movement. In the example embodiment depicted in FIG. 1, computing device 110 (e.g., via processor(s) 112) can implement (e.g., execute, run) video chat application 120 to allow for an entity (e.g., an authorized participant) to initiate, join, and/or otherwise participate in a video chat session in accordance with example embodiments of the present disclosure.

In at least one embodiment, facial recognition module 122 can constitute and/or include, for instance, a machine learning and/or a face matching algorithm and/or model that can learn skeletal key points of an entity and/or subsequently use such skeletal key points to identify the entity in a chat view associated with a video chat session and/or detect another entity in such a chat view. In this or another embodiment, computing device 110 (e.g., via processor(s) 112) can implement (e.g., execute, run) facial recognition module 122 to identify an authorized participant in a chat view associated with a video chat session and/or to detect an unauthorized participant in such a chat view in accordance with example embodiments described herein.

In at least one embodiment, feature tracking algorithm 124 can constitute and/or include a feature tracking algorithm such as, for instance, the Kanade-Lucas-Tomasi (KLT) algorithm that can track the movement of an entity within a chat view associated with a video chat session to determine whether the entity has move outside of and/or returned to a chat zone and/or reference location associated with the entity. In this or another embodiment, computing device 110 (e.g., via processor(s) 112) can implement (e.g., execute, run) feature tracking algorithm 124 to track the movement of a participant (e.g., an authorized participant) within a chat view associated with a video chat session to determine whether the participant has move outside of and/or returned to a chat zone and/or reference location associated with the participant in accordance with example embodiments described herein.

Associated display device 126 according to example embodiments described herein can be any type of display device that can be configured to display visual data such as, for instance, images and/or video (e.g., captured by camera 132 or a camera of another computing device) and can be coupled to, included with, and/or otherwise associated with computing device 110. For example, in at least one embodiment, associated display device 126 can be a monitor, a screen, and/or a display device that can include, but is not limited to a smartphone screen, a tablet screen, a laptop display device, a communicatively connected display device, and/or another associated monitor, screen, and/or display device.

Encoder 128 according to example embodiments described herein can constitute and/or include, for instance, a video encoder (e.g., hardware and/or software video encoder) that can be configured to compress and/or encode video data (e.g., video stream, video frame(s), image data, statistical data corresponding to such video data). In some embodiments, encoder 128 can be configured to compress and/or encode (e.g., using a compression algorithm such as, for instance, a data compression algorithm) image and/or video data (e.g., images, video) captured by camera 132 during a video chat session. Decoder 130 according to example embodiments described herein can constitute and/or include, for instance, a video decoder (e.g., hardware and/or software video decoder) that can be configured to decompress and/or decode video data (e.g., video stream, video frame(s), image data, statistical data corresponding to such video data). In some embodiments, decoder 130 can be configured to decompress and/or decode image and/or video data (e.g., images, video) captured by camera 132 and/or a camera of another computing device (e.g., computing device 230, 240, and/or 250 described below and illustrated in FIG. 2) during a video chat session.

Camera 132 according to example embodiments described herein can be any device capable of capturing visual data that can constitute and/or be indicative of image(s) and/or video. For example, camera 132 can constitute and/or include a digital camera, an analog camera, an integrated camera, and/or another camera that can be included in, coupled to, and/or otherwise associated with computing device 110.

Figure 2:
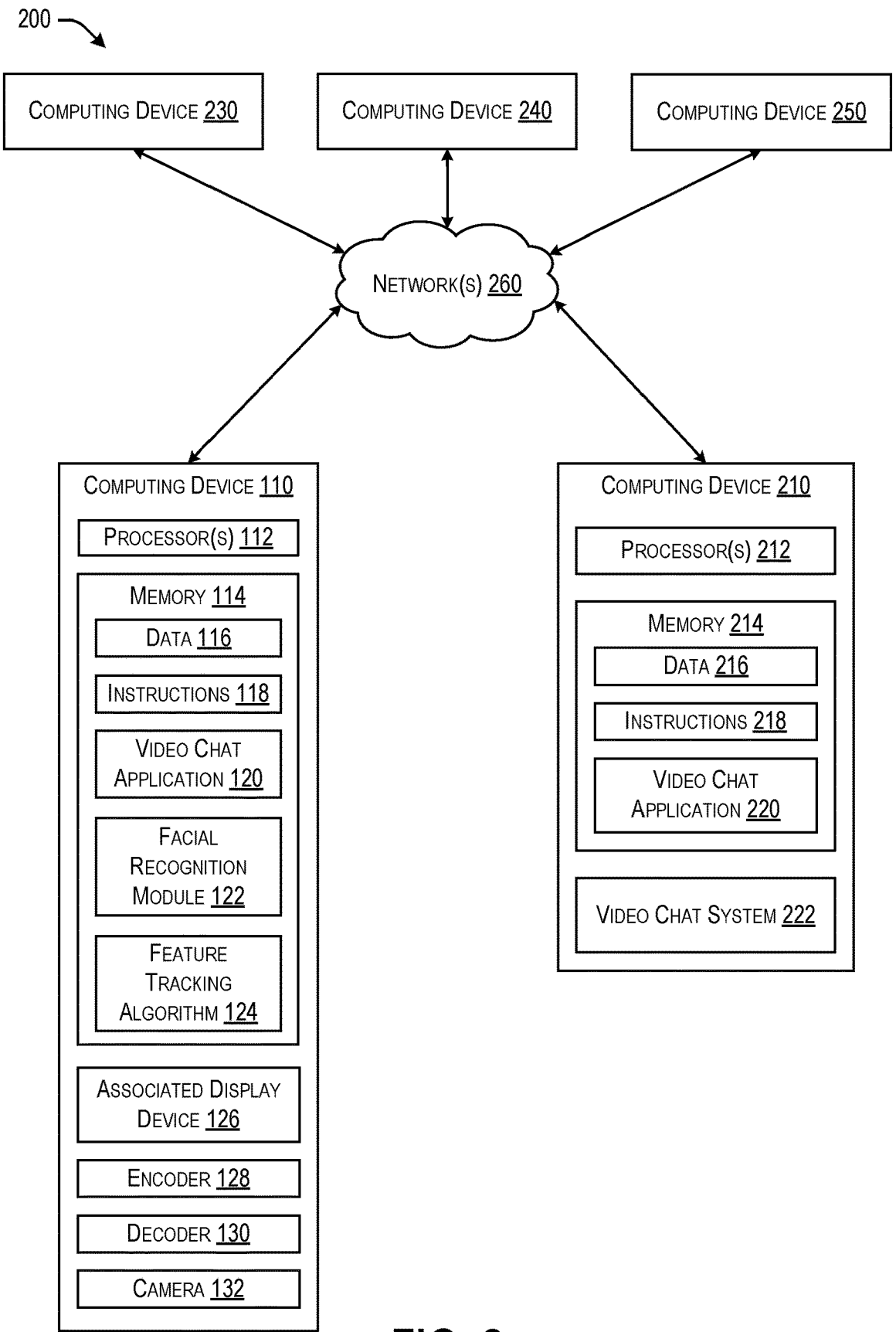
FIG. 2 illustrates a block diagram of an example, non-limiting video chat environment according to one or more example embodiments of the present disclosure.

FIG. 2 illustrates a block diagram of an example, non-limiting video chat environment 200 according to one or more example embodiments of the present disclosure. In the example embodiment depicted in FIG. 2, video chat environment 200 can facilitate (e.g., orchestrate, provide for, support) a video chat session (e.g., a video conference) that can be conducted using multiple computing devices that can be coupled (e.g., communicatively, operatively) to one another by way of a wired and/or a wireless network.

As illustrated in the example embodiment depicted in FIG. 2, video chat environment 200 can include one or more computing devices 110, 210, 230, 240, 250 that can be coupled (e.g., communicatively, operatively) to one another through one or more networks 260. Although five computing devices 110, 210, 230, 240, 250 are depicted in the example embodiment illustrated in FIG. 2, any number of computing devices can be included in video chat environment 200 and coupled (e.g., communicatively, operatively) to one another over network(s) 260.

In the example embodiment depicted in FIG. 2, each computing device 230, 240, and/or 250 can respectively facilitate modification of visual data (e.g., image(s), video) in a chat view associated with a video chat session based at least in part on (e.g., in response to) user identification and/or user movement in accordance with example embodiments of the present disclosure. In some embodiments, each computing device 230, 240, and/or 250 can respectively facilitate modification of visual data (e.g., image(s), video) in a chat view associated with a video chat session based at least in part on (e.g., in response to) user identification and/or user movement in the same manner as computing device 110. That is, for instance, in these embodiments, each computing device 230, 240, and/or 250 can respectively perform the same operations described above that can be performed by computing device 110 to facilitate modification of visual data (e.g., image(s), video) in a chat view associated with a video chat session based at least in part on (e.g., in response to) user identification and/or user movement in accordance with example embodiments of the present disclosure. However, a repeated, comprehensive description of all of such operations is omitted here for brevity.

In example embodiments of the present disclosure, computing devices 230, 240, 250 can each be, for example, a client computing device, a computer, a laptop, a cellular phone, a smartphone, a tablet, a wearable computing device (e.g., smart glasses, smart watch), and/or another computing device. In some embodiments, computing devices 230, 240, 250 can each be the same type of computing device and/or include the same components, structure, attributes, and/or functionality as that of computing device 110. In some embodiments, computing devices 230, 240, 250 can each be a different type of computing device and/or include components, structure, attributes, and/or functionality that are different from that of computing device 110.

Although not illustrated in the example embodiment depicted in FIG. 2, in at least one embodiment of the present disclosure, computing device 230, 240, and/or 250 can include processor(s) 112, memory 114, associated display device 126, encoder 128, decoder 130, and/or camera 132 described above with reference to FIG. 1. In this or another embodiment, although not illustrated in the example embodiment depicted in FIG. 2, memory 114 that can be included in computing device 230, 240, and/or 250 can include data 116, instructions 118, video chat application 120, facial recognition module 122, and/or feature tracking algorithm 124 described above with reference to FIG. 1. In this or another embodiment, although not illustrated in the example embodiment depicted in FIG. 2, data 116 that can be included in computing device 230, 240, and/or 250 can include authorized participant face set 402 (e.g., reference and/or runtime face embeddings and/or feature vectors corresponding to an authorized participant) and/or chat zone pose set 404 (e.g., reference and/or runtime key point data corresponding to an authorized participant) described below and illustrated in the example embodiment depicted in FIG. 4.

In example embodiments of the present disclosure, computing device 210 can be, for example, a computer, a server, a host server, and/or any other computing device that can be configured such that it can be used to implement (e.g., execute, run), operate, and/or manage video chat system(s) and/or video chat application(s). As illustrated in the example embodiment depicted in FIG. 2, computing device 210 can include one or more processors 212, memory 214, and/or a video chat system 222.

Processor(s) 212 according to example embodiments described herein can each be a processing device. For example, in the example embodiment depicted in FIG. 2, processor(s) 212 can each be a central processing unit (CPU), microprocessor, microcontroller, integrated circuit (e.g., an application specific integrated circuit (ASIC)), and/or another type of processing device.

In some embodiments, processor(s) 212 can each be the same type of processor and/or include the same components, structure, attributes, and/or functionality as that of processor(s) 112. In some embodiments, processor(s) 212 can each be a different type of processor and/or include components, structure, attributes, and/or functionality that are different from that of processor(s) 112.

Memory 214 according to example embodiments described herein can store computer-readable and/or computer executable entities (e.g., data, information, applications, models, algorithms, etc.) that can be created, modified, accessed, read, retrieved, and/or executed by each of processor(s) 212. In some embodiments, memory 214 can constitute, include, be coupled to (e.g., operatively), and/or otherwise be associated with a computing system and/or media such as, for example, one or more computer-readable media, volatile memory, non-volatile memory, random-access memory (RAM), read only memory (ROM), hard drives, flash drives, and/or other memory devices. In these or other embodiments, such one or more computer-readable media can include, constitute, be coupled to (e.g., operatively), and/or otherwise be associated with one or more non-transitory computer-readable media.

In some embodiments, memory 214 can be the same type of memory and/or include the same components, structure, attributes, and/or functionality as that of memory 114. In some embodiments, memory 214 can be a different type of memory and/or include components, structure, attributes, and/or functionality that are different from that of memory 114. In the example embodiment depicted in FIG. 2, memory 214 can include data 216, instructions 218, and/or a video chat application 220.

Data 216 according to example embodiments described herein can constitute and/or include, for instance, structured data, unstructured data, application specific data, and/or another type of data. In some embodiments, data 216 can constitute and/or include any type of data described herein that can be generated, managed (e.g., stored), communicated (e.g., over a wired and/or wireless network), and/or utilized (e.g., referenced, ingested as input) in accordance with example embodiments of the present disclosure.

In at least one embodiment, data 216 can include data that can be used by computing device 210 to implement (e.g., execute, run), operate, and/or manage video chat application 220 and/or video chat system 222 in accordance with example embodiments of the present disclosure. For example, in this or another embodiment, data 216 can include data that can be associated with, specific to, and/or received from computing device 110, 230, 240, and/or 250 over network(s) 260. For instance, in some embodiments, data 216 can include data that can be indicative of and/or descriptive of: an identity of computing device 110, 230, 240, and/or 250 (e.g., a device identification number, serial number, model number); a location of computing device 110, 230, 240, and/or 250; device specific application data associated with and/or used by video chat application 120 that can run on computing device 110, 230, 240, and/or 250.

Although not depicted in the example embodiment illustrated in FIG. 2, data 216 according to example embodiments described herein can include, for instance, the face embedding(s) and/or feature vector(s) (e.g., reference feature vector(s), runtime feature vector(s)) described above that can represent, correspond to, and/or be indicative of an entity such as, for example, an authorized participant or an unauthorized participant of a video chat session. For example, in one embodiment, data 216 can include authorized participant face set 402 described below and illustrated in the example embodiment depicted in FIG. 4.

Additionally, or alternatively, although not depicted in the example embodiment illustrated in FIG. 2, data 216 according to example embodiments described herein can include, for instance, the key point data (e.g., skeletal key points, reference key point data, runtime key point data) described above that can represent, correspond to, and/or be indicative of an entity such as, for example, an authorized participant of a video chat session. For example, in one embodiment, data 216 can include chat zone pose set 404 described below and illustrated in the example embodiment depicted in FIG. 4.

In some embodiments, data 116 (e.g., authorized participant face set 402 and/or chat zone pose set 404) that can be stored respectively on each memory 114 of computing device 110, 230, 240, and/or 250 can be transmitted over network(s) 260 (e.g., during operation of video chat application 120 and/or video chat system 222) between computing devices 110, 230, 240, 250. In these or other embodiments, data 116 (e.g., authorized participant face set 402 and/or chat zone pose set 404) that can be stored respectively on each memory 114 of computing device 110, 230, 240, and/or 250 can be used (e.g., during operation of video chat application 120 and/or video chat system 222) by any of computing devices 110, 230, 240, 250 to facilitate modification of visual data (e.g., image(s), video) in a chat view associated with a video chat session based at least in part on (e.g., in response to) user identification and/or user movement in accordance with example embodiments described herein.

In some embodiments, data 116 and/or data 216 (e.g., authorized participant face set 402 and/or chat zone pose set 404) can be transmitted over network(s) 260 (e.g., during operation of video chat application 120, video chat application 220, and/or video chat system 222) between computing device 210 and any of computing devices 110, 230, 240, 250. In some embodiments, data 116 and/or data 216 (e.g., authorized participant face set 402 and/or chat zone pose set 404) can be used (e.g., during operation of video chat application 120 and/or video chat system 222) by any of computing devices 110, 210, 230, 240, 250 to facilitate modification of visual data (e.g., image(s), video) in a chat view associated with a video chat session based at least in part on (e.g., in response to) user identification and/or user movement in accordance with example embodiments described herein. In some embodiments, data 116 and/or data 216 can be accessed by and/or displayed to (e.g., during operation of video chat application 120, video chat application 220, and/or video chat system 222) one or more users of computing device 110, 210, 230, 240, and/or 250.

In some embodiments, data 216 can include image and/or video data that can be indicative of and/or descriptive of image(s) and/or videos, respectively, that can be captured by and/or received from computing device 110, 230, 240, and/or 250, respectively, over network(s) 260. For example, in these or other embodiments, data 216 can include video(s) that can be captured by computing device 110, 230, 240, and/or 250, respectively, when using camera 132 of such device(s) (e.g., when using camera 132 to implement video chat application 120 on such device(s)).

Instructions 218 according to example embodiments described herein can include, for example, any computer-readable and/or computer executable instructions (e.g., software, routines, processing threads) that, when executed by processor(s) 212, cause computing device 210 to perform one or more certain operations. For example, in some embodiments, instructions 218 can include instructions that, when executed by processor(s) 212, can cause computing device 210 to perform operations to implement (e.g., execute, run), operate, and/or manage video chat application 220 and/or video chat system 222 in accordance with example embodiments of the present disclosure.

Video chat application 220 according to example embodiments described herein can constitute and/or include a video chat application that can be implemented (e.g., executed, run), operated, and/or managed by computing device 210 to conduct a video chat session between at least two of computing devices 110, 230, 240, 250 in accordance with example embodiments of the present disclosure. In some embodiments, video chat application 220 can be the same type of application and/or include the same components, structure, attributes, and/or functionality as that of video chat application 120. In some embodiments, video chat application 220 can be a different type of application compared to video chat application 120 and/or include components, structure, attributes, and/or functionality that are different from that of video chat application 120.

Video chat system 222 according to example embodiments of the present disclosure can constitute and/or include a "system" as defined herein that can be implemented by computing device 210 (e.g., via processor(s) 212). As referenced herein, the term "system" can refer to hardware (e.g., application specific hardware), computer logic that executes on a general-purpose processor (e.g., a central processing unit (CPU)), and/or some combination thereof. In some embodiments, a "system" can be implemented in hardware, application specific circuits, firmware, and/or software controlling a general-purpose processor. In some embodiments, a "system" can be implemented as program code files stored on a storage device, loaded into memory and executed by a processor, and/or can be provided from computer program products, for example, computer-executable instructions that are stored in a tangible computer-readable storage medium (e.g., random-access memory (RAM), hard disk, optical media, magnetic media).

In some embodiments, video chat system 222 can constitute, include, be coupled to (e.g., communicatively, operatively), and/or otherwise be associated with hardware (e.g., application specific hardware), computer logic that can execute on processor(s) 212 (e.g., a general-purpose processor, a central processing unit (CPU)), and/or some combination thereof. In some embodiments, video chat system 222 can be implemented in hardware, application specific circuits, firmware, and/or software controlling processor(s) 212. In some embodiments, video chat system 222 can be implemented as program code files stored on a memory 214, loaded into memory 214 and executed by processor(s) 212, and/or can be provided from computer program products, for example, computer-executable instructions that are stored in memory 214 (e.g., a tangible computer-readable storage medium, random-access memory (RAM), hard disk, optical media, magnetic media).

In some embodiments, computing device 210 (e.g., via processor(s) 212) can implement video chat system 222 to operate, support, and/or manage video chat application 220 and/or video chat application 120 that can be executed respectively by any of computing devices 110, 230, 240, 250. In some embodiments, computing device 210 (e.g., via processor(s) 212) can implement video chat system 222 to allow for any of computing devices 110, 230, 240, 250 (e.g., during operation of video chat application 120) to facilitate modification of visual data (e.g., image(s), video) in a chat view associated with a video chat session based at least in part on (e.g., in response to) user identification and/or user movement in accordance with example embodiments of the present disclosure.

Network(s) 260 according to example embodiments described herein can be any type of communications network such as, for example, a local area network (e.g., intranet), wide area network (e.g., Internet), and/or some combination thereof. In some embodiments, communication between any of computing devices 110, 210, 230, 240, and/or 250 can be carried via network interface with network(s) 260 using any type of wired and/or wireless connection, using a variety of communication protocols, encodings or formats, and/or protection schemes. For example, in at least one embodiment, communication between such devices can be carried via network interface with network(s) 260 using: communication protocols such as, for instance, transmission control protocol/internet protocol (TCP/IP), hypertext transfer protocol (HTTP), simple mail transfer protocol (SMTP), file transfer protocol (FTP), user datagram protocol (UDP), real-time transport protocol (RTP), and/or real-time transport control protocol (RTCP); encodings or formats such as, for instance, hypertext markup language (HTML) and/or extensible markup language (XML); and/or protection schemes such as, for instance, virtual private network (VPN), secure HTTP, secure shell (SSH), secure sockets layer (SSL), and/or secure real-time transport protocol (SRTP).

FIGS. 3A, 3B, 3C, and 3D illustrate example, non-limiting chat view diagrams 300a, 300b, 300c, and 300d, respectively, according to one or more example embodiments of the present disclosure. In the example embodiments depicted in FIGS. 3A, 3B, 3C, and 3D, chat view diagrams 300a, 300b, 300c, and 300d provide example illustrations of how a computing device described herein such as, for instance, computing device 110 can facilitate modification of visual data (e.g., image(s), video) in a chat view associated with a video chat session based at least in part on (e.g., in response to) user identification and/or user movement.

In the example embodiments depicted in FIGS. 3A, 3B, 3C, and 3D, each chat view diagram 300a, 300b, 300c, and 300d includes a chat view 302 that can be rendered by a computing device in, for instance, a video chat user interface of a video chat application during a video chat session. For example, each chat view 302 illustrated in the example embodiments depicted in FIGS. 3A, 3B, 3C, and 3D can be rendered by computing device 110 in a video chat user interface of video chat application 120 during a video chat session.

Figure 3:
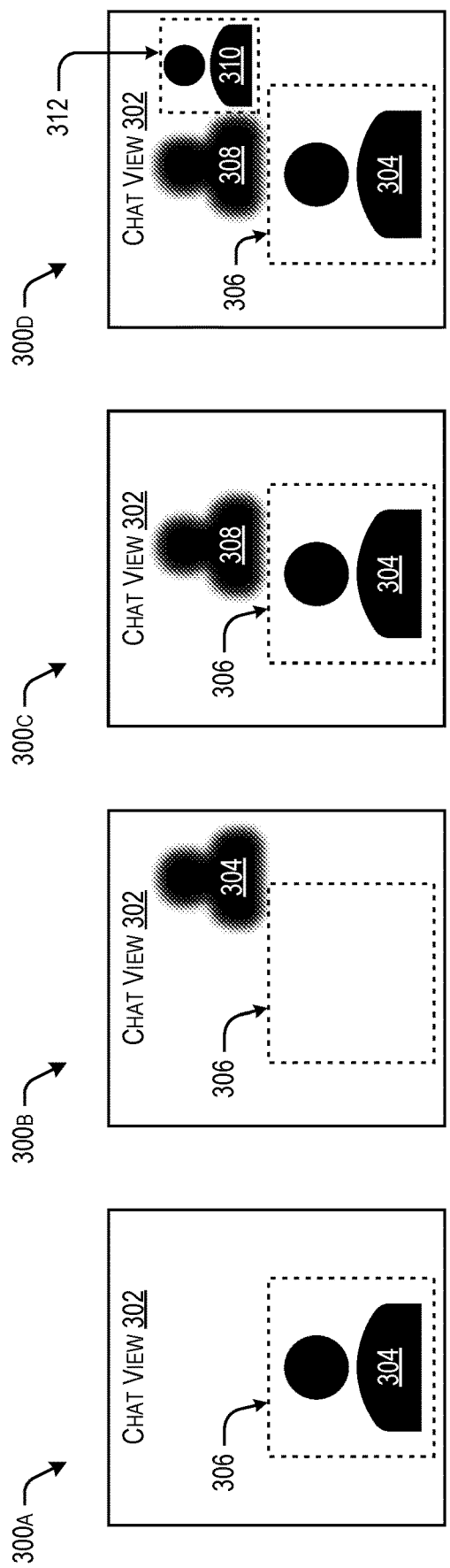
FIGS. 3A, 3B, 3C, and 3D each illustrate an example, non-limiting chat view diagram according to one or more example embodiments of the present disclosure.

In the example embodiment depicted in FIG. 3A, chat view diagram 300a provides an example illustration of how computing device 110 can identify (e.g., via facial recognition module 122 using face embeddings and/or feature vectors as described herein) an authorized participant 304 in chat view 302 and render visual data indicative of authorized participant 304 with a relatively high resolution in a foreground section of chat view 302. In this example embodiment, chat view diagram 300a further provides an example illustration of how computing device 110 can define (e.g., via facial recognition module 122 using skeletal key points and/or reference key point data as described herein) a chat zone 306 (e.g., reference location) corresponding to authorized participant 304.

In the example embodiment depicted in FIG. 3B, chat view diagram 300b provides an example illustration of how computing device 110 can determine (e.g., via feature tracking algorithm 124 using reference and runtime key point data and/or feature vectors as described herein) that authorized participant 304 has moved outside of chat zone 306. In this example embodiment, chat view diagram 300b further provides an example illustration of how computing device 110 can conceal (e.g., blur, hide, mask) visual data indicative of authorized participant 304 with a relatively low resolution in a background section of chat view 302 based in part on (e.g., in response to) determining that authorized participant 304 moved outside of chat zone 306.

In the example embodiment depicted in FIG. 3C, chat view diagram 300c provides an example illustration of how computing device 110 can: identify authorized participant 304 in chat view 302; render visual data indicative of authorized participant 304 with a relatively high resolution in a foreground section of chat view 302; and define chat zone 306 corresponding to authorized participant 304. In this example embodiment, chat view diagram 300c further provides an example illustration of how computing device 110 can also detect (e.g., via facial recognition module 122 using face embeddings and/or feature vectors as described herein) an unauthorized participant 308 in chat view 302 (e.g., in a background section of chat view 302) and conceal (e.g., blur, hide, mask) visual data indicative of unauthorized participant 308 with a relatively low resolution in a background section of chat view 302.

In the example embodiment depicted in FIG. 3D, chat view diagram 300d provides an example illustration of how computing device 110 can: identify authorized participant 304 in chat view 302; render visual data indicative of authorized participant 304 with a relatively high resolution in a foreground section of chat view 302; define chat zone 306 corresponding to authorized participant 304; detect unauthorized participant 308 in chat view 302; and conceal visual data indicative of unauthorized participant 308 with a relatively low resolution in a background section of chat view 302. In this example embodiment, chat view diagram 300d further provides an example illustration of how computing device 110 can identify (e.g., via facial recognition module 122 using face embeddings and/or feature vectors as described herein) a second authorized participant 310 in chat view 302 (e.g., in a background section of chat view 302) and render visual data indicative of second authorized participant 310 with a relatively high resolution in a background section of chat view 302. In this example embodiment, chat view diagram 300d further provides an example illustration of how computing device 110 can define (e.g., via facial recognition module 122 using skeletal key points and/or reference key point data as described herein) a chat zone 312 (e.g., reference location) corresponding to second authorized participant 310.

Figure 4:
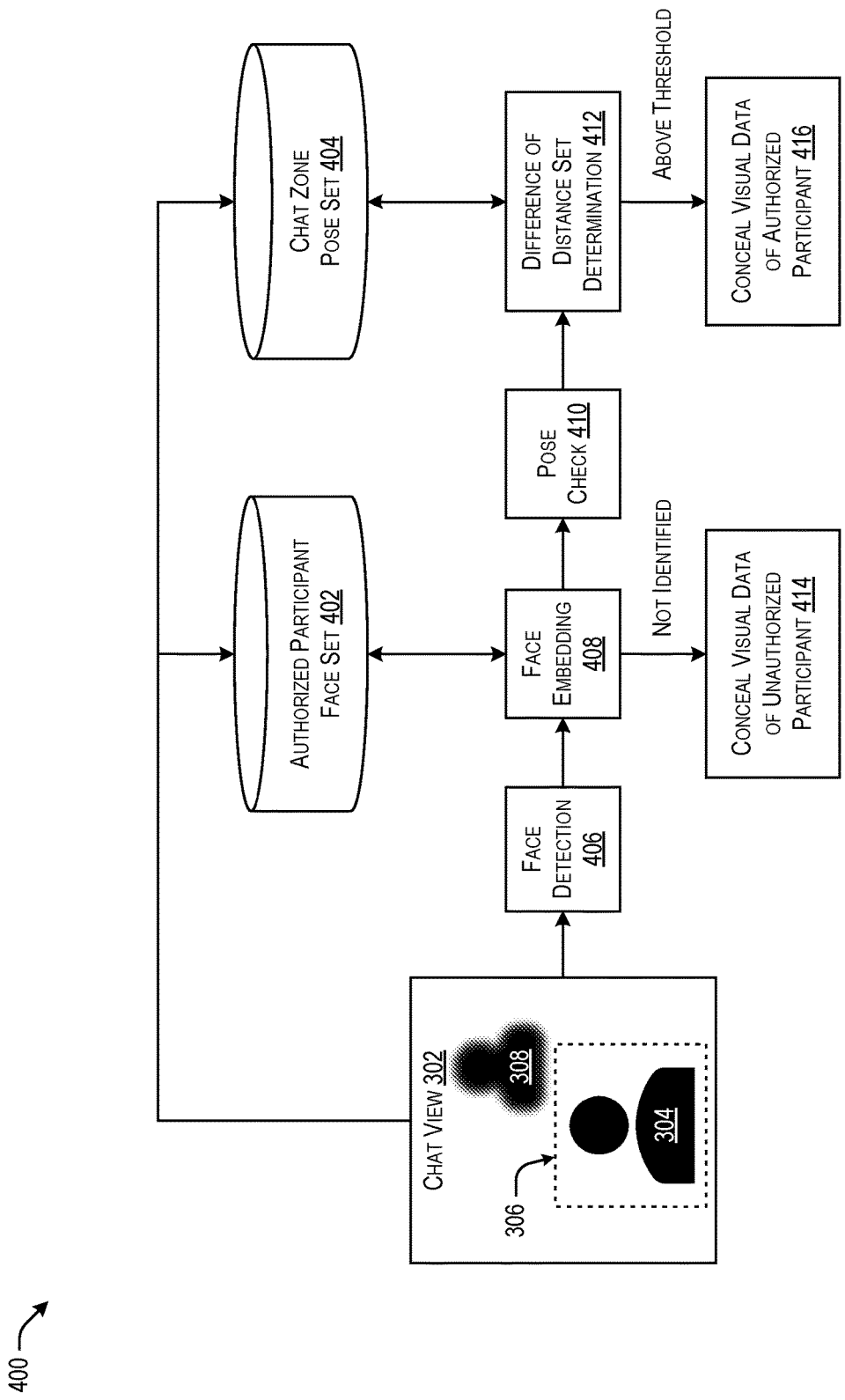
FIG. 4 illustrates a block diagram of an example, non-limiting process and data flow according to one or more example embodiments of the present disclosure.

FIG. 4 illustrates a block diagram of an example, non-limiting process and data flow 400 according to one or more example embodiments of the present disclosure. In example embodiments of the present disclosure, computing device 110 can implement (e.g., perform, execute, run) process and data flow 400 during a video chat session to facilitate modification of visual data (e.g., image(s), video) in a chat view associated with the video chat session based at least in part on (e.g., in response to) user identification and/or user movement.

In the example embodiment depicted in FIG. 4, computing device 110 can perform the above-described face calibration process using facial recognition module 122 to authenticate and/or identify authorized participant 304 in chat view 302 as an intended participant and/or invitee of a video chat session. In this embodiment, in performing such a face calibration process, computing device 110 can generate one or more face embeddings and/or feature vectors (e.g., via facial recognition module 122) that can represent, correspond to, and/or be indicative of authorized participant 304. In this embodiment, computing device 110 can store such face embeddings and/or feature vectors of authorized participant 304 as part of authorized participant face set 402, which can constitute, for instance, a database and/or a text file that can be stored in, for example, memory 114.

In some embodiments, computing device 110 can perform the face calibration process using facial recognition module 122 to authenticate and/or identity one or more other authorized participants in chat view 302 as intended participant(s) and/or invitee(s) of the video chat session. In these embodiments, computing device 110 can store such face embedding(s) and/or feature vector(s) of such other authorized participant(s) as part of authorized participant face set 402.

In the example embodiment depicted in FIG. 4, computing device 110 can perform the above-described chat zone calibration process using facial recognition module 122 and/or feature tracking algorithm 124 to define chat zone 306 corresponding to authorized participant 304. For example, in this embodiment, computing device 110 can use facial recognition module 122 and/or feature tracking algorithm 124 as described above to learn the skeletal key points of authorized participant 304 to obtain and/or generate reference key point data and/or reference feature vector(s) that can be descriptive of authorized participant 304 and/or indicative of authorized participant 304 being positioned in chat zone 306 (e.g., positioned at a reference location). As illustrated in the example embodiment depicted in FIG. 4, computing device 110 can store such reference key point data and/or reference feature vector(s) of authorized participant 304 as part of chat zone pose set 404, which can constitute, for instance, a database and/or a text file that can be stored in, for example, memory 114.

In the example embodiment depicted in FIG. 4, during the video chat session, computing device 110 can perform operations that can include, for instance, face detection 406, face embedding 408, pose check 410, and/or difference of distance set determination 412. In this embodiment, based at least in part on (e.g., in response to) performing such operations, computing device 110 can further perform operations that can include, for instance, concealing visual data of unauthorized participant 414 and/or concealing visual data of authorized participant 416.

In the example embodiment depicted in FIG. 4, during the video chat session, computing device 110 can perform face detection 406 by implementing (e.g., executing, running) facial recognition module 122 to detect an entity in chat view 302. In this embodiment, based at least in part on (e.g., in response to) detecting such an entity in chat view 302, computing device 110 can access authorized participant face set 402 to perform face embedding 408. For instance, in this embodiment, computing device 110 can use the face embedding(s) and/or feature vector(s) of authorized participant 304 that can be included in authorized participant face set 402 to identify authorized participant 304 as an intended participant and/or invitee of the video chat session as described below and in other example embodiments of the present disclosure.

In the example embodiment depicted in FIG. 4, if computing device 110 determines (e.g., via facial recognition module 122) that face embedding(s) and/or feature vector(s) corresponding to such an entity appearing in chat view 302 match the face embedding(s) and/or feature vector(s) corresponding to authorized participant 304, computing device 110 can render (e.g., visually display) visual data (e.g., images, video) indicative of authorized participant 304 in chat view 302 (e.g., in a foreground section of chat view 302) using a relatively high resolution as illustrated in FIG. 4. In this embodiment, if computing device 110 determines (e.g., via facial recognition module 122) that the face embedding(s) and/or feature vector(s) corresponding to the entity appearing in chat view 302 do not match the face embedding(s) and/or feature vector(s) corresponding to authorized participant 304, computing device 110 can thereby determine that the entity is an unauthorized participant 308 and can further perform the operation of concealing visual data of unauthorized participant 414. For example, in this embodiment, computing device 110 can conceal (e.g., blur, hide, mask) visual data (e.g., images, video) indicative of unauthorized participant 308 in chat view 302 (e.g., in a background section of chat view 302) using a relatively low resolution as illustrated in FIG. 4.

In the example embodiment depicted in FIG. 4, during the video chat session, computing device 110 can perform pose check 410 by implementing (e.g., executing, running) feature tracking algorithm 124 to determine that authorized participant 304 is positioned within chat zone 306 and/or to track the movement of authorized participant 304 in chat view 302 and/or in chat zone 306. In this embodiment, in performing pose check 410 and/or tracking the movement of authorized participant 304, computing device 110 can further perform difference of distance set determination 412 to determine (e.g., via feature tracking algorithm 124) whether authorized participant 304 has moved outside chat zone 306 as described below and in other example embodiments of the present disclosure.

In the example embodiment depicted in FIG. 4, in performing difference of distance set determination 412, computing device 110 can generate (e.g., via facial recognition module 122 and/or feature tracking algorithm 124) runtime key point data and/or runtime feature vector(s) that can be descriptive of authorized participant 304 and/or indicative of authorized participant 304 being positioned at location(s) in chat view 302 during the video chat session. In this embodiment, in performing difference of distance set determination 412, computing device 110 can compare (e.g., via facial recognition module 122 and/or feature tracking algorithm 124) the reference and runtime key point data and/or feature vector(s) of authorized participant 304 to determine whether a difference in distances (e.g., between skeletal key points) corresponding to such reference and runtime key point data and/or feature vector(s) of authorized participant 304 exceeds a defined threshold value (e.g., a pre-defined distance and/or percentage value).

In the example embodiment depicted in FIG. 4, if computing device 110 determines (e.g., via facial recognition module 122 and/or feature tracking algorithm 124) that a difference in distances (e.g., between skeletal key points) corresponding to the reference and runtime key point data and/or feature vector(s) of authorized participant 304 exceeds a defined threshold value (e.g., a pre-defined distance and/or percentage value), computing device 110 can perform the operation of concealing visual data of authorized participant 416. For example, in this embodiment, although not illustrated in FIG. 4, upon determining that authorized participant 304 has moved outside chat zone 306, computing device 110 can conceal (e.g., blur, hide, mask) visual data (e.g., images, video) indicative of authorized participant 304 in chat view 302 (e.g., in a background section of chat view 302) using a relatively low resolution (e.g., as illustrated in chat view diagram 300*b* depicted in FIG. 3B). In some embodiments, upon determining (e.g., via facial recognition module 122 and/or feature tracking algorithm 124) that authorized participant 304 has returned to chat zone 306, computing device 110 can again render (e.g., visually display) visual data (e.g., images, video) indicative of authorized participant 304 in chat view 302 (e.g., in a foreground section of chat view 302) using a relatively high resolution as illustrated in FIG. 4.

Figure 5:
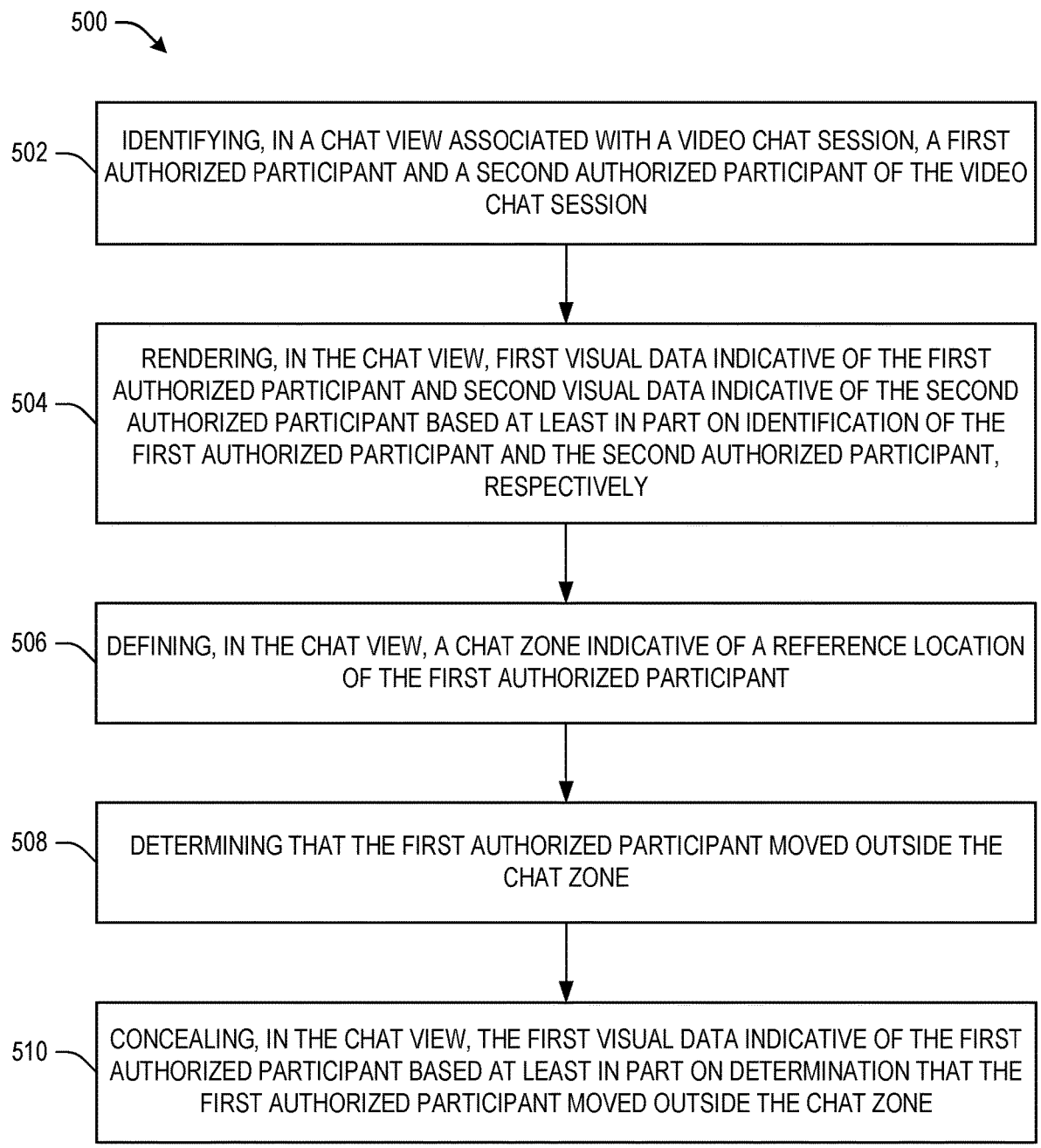
FIGS. 5, 6, 7, and 8 each illustrate a diagram of an example, non-limiting computer-implemented method according to one or more example embodiments of the present disclosure.

FIG. 5 illustrates a flow diagram of an example, non-limiting computer-implemented method 500 according to one or more example embodiments of the present disclosure. Computer-implemented method 500 can be implemented using, for instance, computing device 110, 210, 230, 240, or 250 described above with reference to the example embodiments depicted in FIGS. 1 and 2.

The example embodiment illustrated in FIG. 5 depicts operations performed in a particular order for purposes of illustration and discussion. Those of ordinary skill in the art, using the disclosures provided herein, will understand that various operations or steps of computer-implemented method 500 or any of the other methods disclosed herein may be adapted, modified, rearranged, performed simultaneously, include operations not illustrated, and/or modified in various ways without deviating from the scope of the present disclosure.

At 502, computer-implemented method 500 can include identifying (e.g., by computing device 110 using facial recognition module 122 and/or authorized participant face set 402), in a chat view (e.g., chat view 302) associated with a video chat session (e.g., a video chat session conducted using video chat application 120, video chat application 220, and/or video chat system 222), a first authorized participant (e.g., authorized participant 304) and a second authorized participant (e.g., second authorized participant 310) of the video chat session.

At 504, computer-implemented method 500 can include rendering (e.g., by computing device 110), in the chat view, first visual data indicative of the first authorized participant and second visual data indicative of the second authorized participant based at least in part on (e.g., in response to) identification of the first authorized participant and the second authorized participant, respectively. For example, computing device 110 can render visual data corresponding respectively to authorized participant 304 and second authorized participant 310 as described above and illustrated in the example embodiment depicted in FIG. 3D.

At 506, computer-implemented method 500 can include defining (e.g., by computing device 110 using facial recognition module 122 and/or feature tracking algorithm 124), in the chat view, a chat zone (e.g., chat zone 306) indicative of a reference location (e.g., a location and/or orientation usually occupied by authorized participant 304 during a video chat session) of the first authorized participant.

At 508, computer-implemented method 500 can include determining (e.g., by computing device 110 using facial recognition module 122, feature tracking algorithm 124, and/or chat zone pose set 404) that the first authorized participant moved outside the chat zone.

At 510, computer-implemented method 500 can include concealing (e.g., by computing device 110), in the chat view, the first visual data indicative of the first authorized participant based at least in part on (e.g., in response to) determination that the first authorized participant moved outside the chat zone. For example, computing device 110 can conceal (e.g., blur, mask, hide) visual data corresponding to authorized participant 304 as described above and illustrated in the example embodiment depicted in FIG. 3B.

Figure 6:
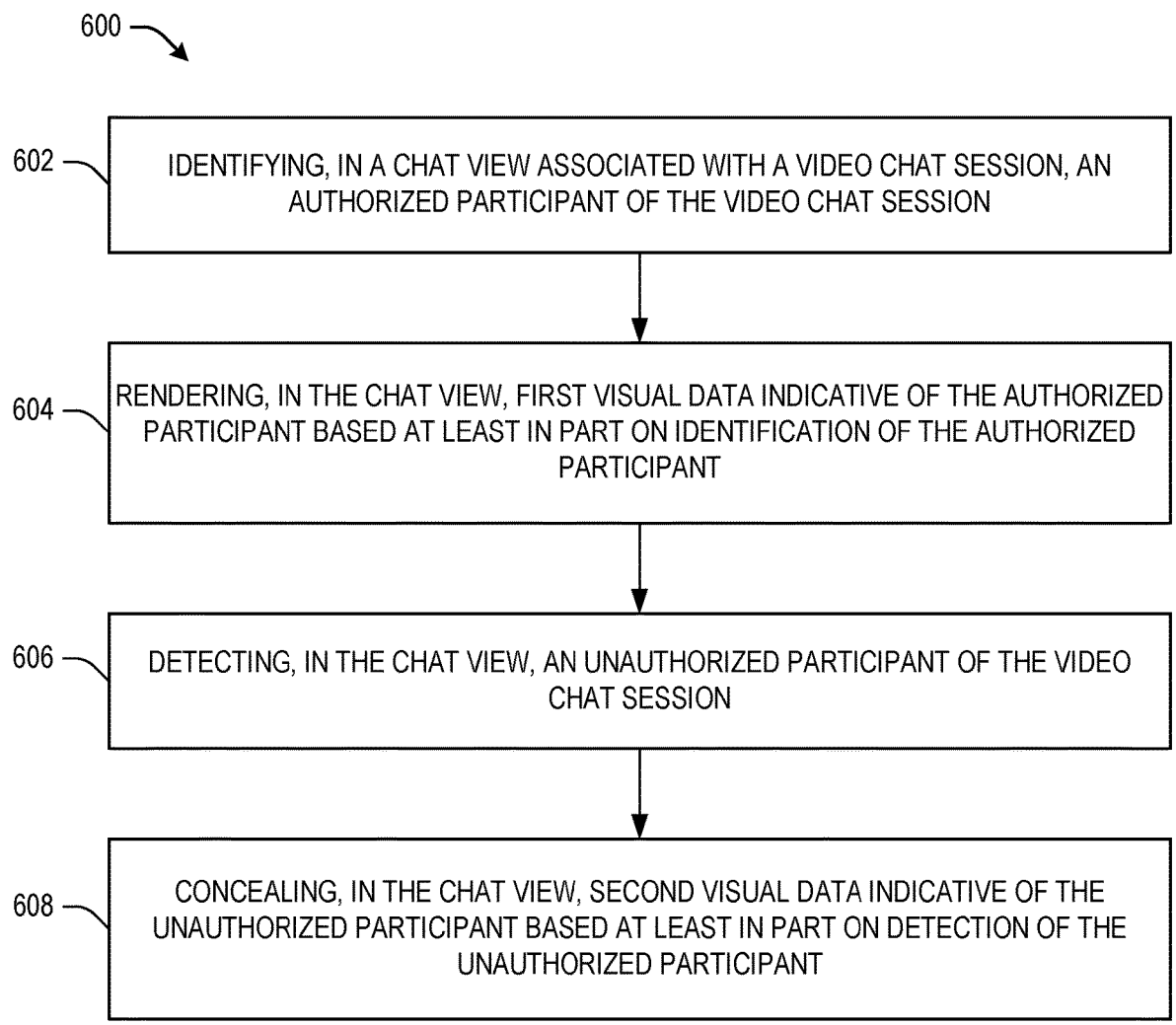

FIG. 6 illustrates a flow diagram of an example, non-limiting computer-implemented method 600 according to one or more example embodiments of the present disclosure. Computer-implemented method 600 can be implemented using, for instance, computing device 110, 210, 230, 240, or 250 described above with reference to the example embodiments depicted in FIGS. 1 and 2.

The example embodiment illustrated in FIG. 6 depicts operations performed in a particular order for purposes of illustration and discussion. Those of ordinary skill in the art, using the disclosures provided herein, will understand that various operations or steps of computer-implemented method 600 or any of the other methods disclosed herein may be adapted, modified, rearranged, performed simultaneously, include operations not illustrated, and/or modified in various ways without deviating from the scope of the present disclosure.

At 602, computer-implemented method 600 can include identifying (e.g., by computing device 110 using facial recognition module 122 and/or authorized participant face set 402), in a chat view (e.g., chat view 302) associated with a video chat session (e.g., a video chat session conducted using video chat application 120, video chat application 220, and/or video chat system 222), an authorized participant (e.g., authorized participant 304) of the video chat session.

At 604, computer-implemented method 600 can include rendering (e.g., by computing device 110), in the chat view, first visual data indicative of the authorized participant based at least in part on (e.g., in response to) identification of the authorized participant. For example, computing device 110 can render visual data corresponding to authorized participant 304 as described above and illustrated in the example embodiment depicted in FIG. 3C.

At 606, computer-implemented method 600 can include detecting (e.g., by computing device 110 using facial recognition module 122 and/or authorized participant face set 402), in the chat view, an unauthorized participant (e.g., unauthorized participant 308) of the video chat session.

At 608, computer-implemented method 600 can include concealing (e.g., by computing device 110), in the chat view, second visual data indicative of the unauthorized participant based at least in part on (e.g., in response to) detection of the unauthorized participant. For example, computing device 110 can conceal (e.g., blur, mask, hide) visual data corresponding to unauthorized participant 308 as described above and illustrated in the example embodiment depicted in FIG. 3C.

Figure 7:
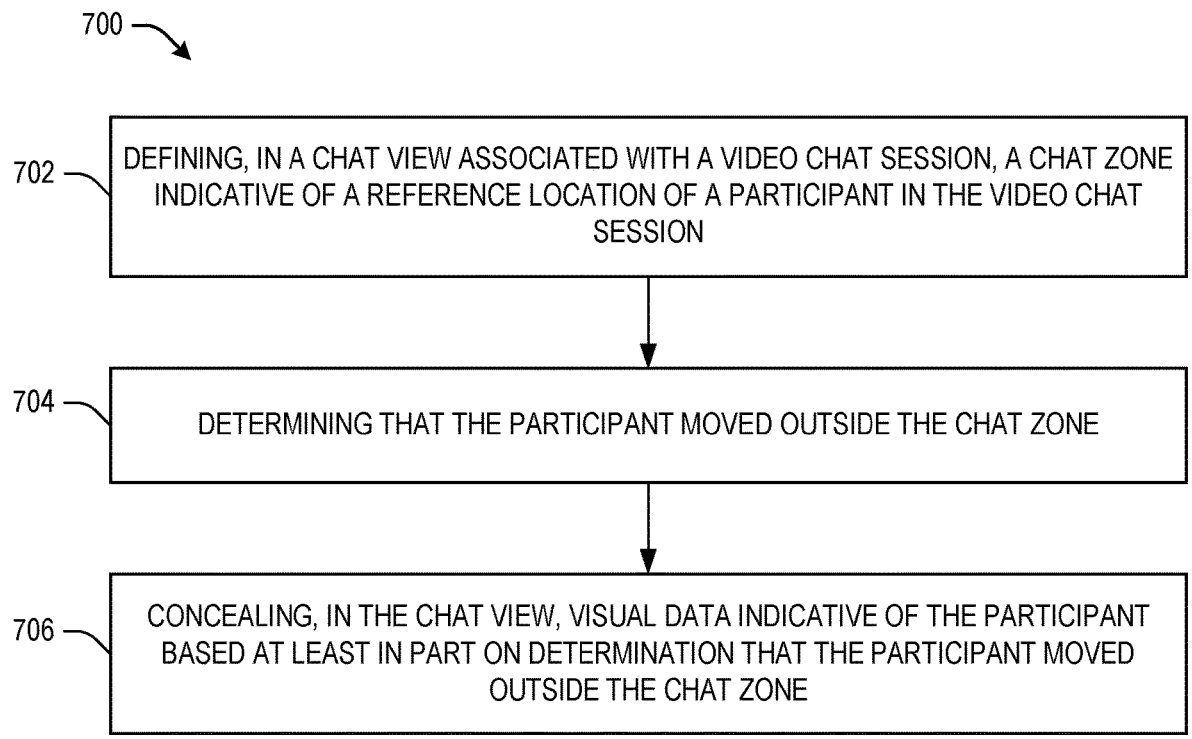

FIG. 7 illustrates a flow diagram of an example, non-limiting computer-implemented method 700 according to one or more example embodiments of the present disclosure. Computer-implemented method 700 can be implemented using, for instance, computing device 110, 210, 230, 240, or 250 described above with reference to the example embodiments depicted in FIGS. 1 and 2.

The example embodiment illustrated in FIG. 7 depicts operations performed in a particular order for purposes of illustration and discussion. Those of ordinary skill in the art, using the disclosures provided herein, will understand that various operations or steps of computer-implemented method 700 or any of the other methods disclosed herein may be adapted, modified, rearranged, performed simultaneously, include operations not illustrated, and/or modified in various ways without deviating from the scope of the present disclosure.

At 702, computer-implemented method 700 can include defining (e.g., by computing device 110 using facial recognition module 122 and/or feature tracking algorithm 124), in a chat view (e.g., chat view 302) associated with a video chat session (e.g., a video chat session conducted using video chat application 120, video chat application 220, and/or video chat system 222), a chat zone (e.g., chat zone 306) indicative of a reference location (e.g., a location and/or orientation usually occupied by authorized participant 304 during a video chat session) of a participant (e.g., authorized participant 304) in the video chat session.

At 704, computer-implemented method 700 can include determining (e.g., by computing device 110 using facial recognition module 122, feature tracking algorithm 124, and/or chat zone pose set 404) that the participant moved outside the chat zone.

At 706, computer-implemented method 700 can include concealing (e.g., by computing device 110), in the chat view, visual data indicative of the participant based at least in part on (e.g., in response to) determination that the participant moved outside the chat zone. For example, computing device 110 can conceal (e.g., blur, mask, hide) visual data corresponding to authorized participant 304 as described above and illustrated in the example embodiment depicted in FIG. 3B.

Figure 8:
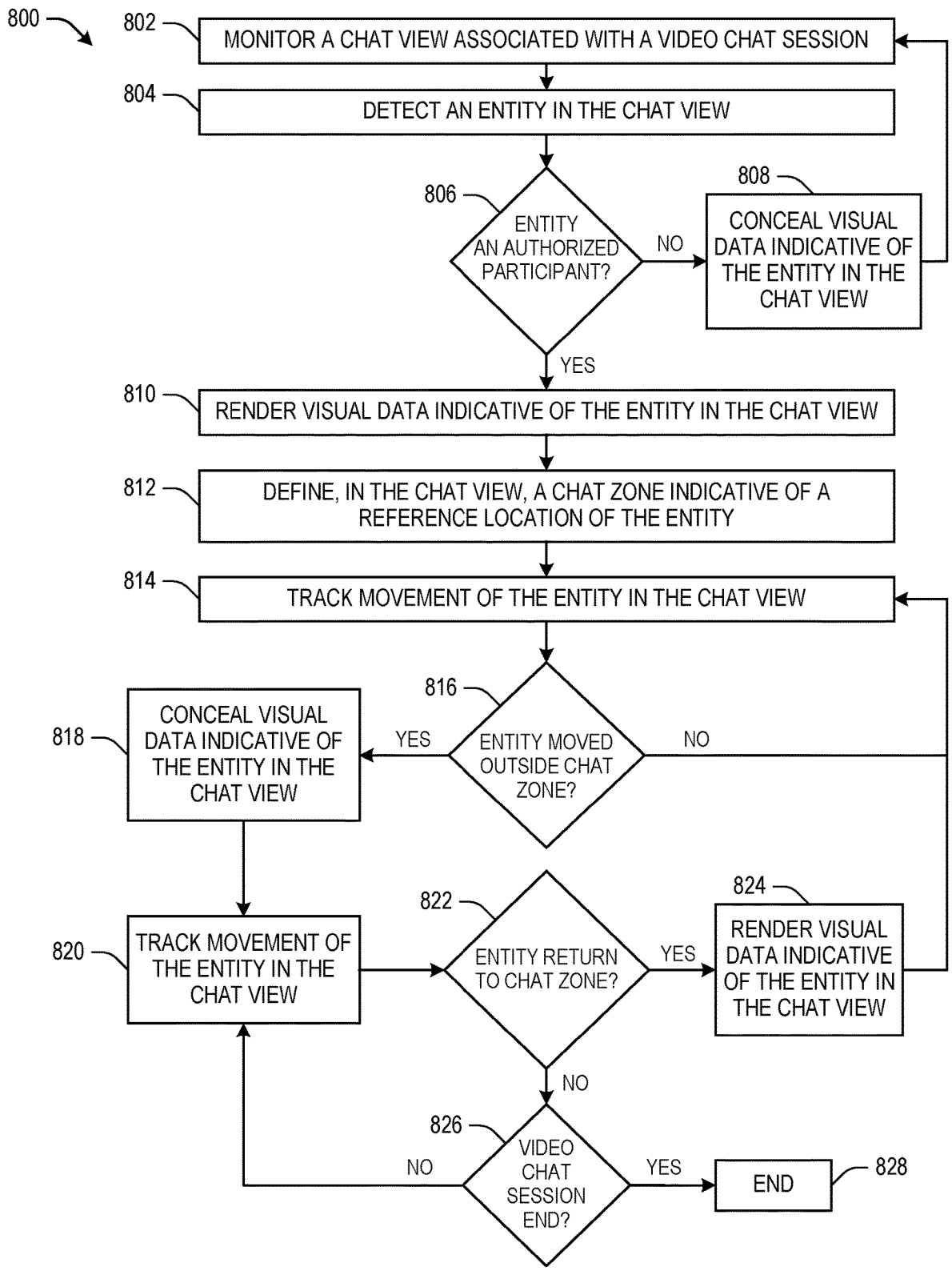

FIG. 8 illustrates a flow diagram of an example, non-limiting computer-implemented method 800 according to one or more example embodiments of the present disclosure. Computer-implemented method 800 can be implemented using, for instance, computing device 110, 210, 230, 240, or 250 described above with reference to the example embodiments depicted in FIGS. 1 and 2.

The example embodiment illustrated in FIG. 8 depicts operations performed in a particular order for purposes of illustration and discussion. Those of ordinary skill in the art, using the disclosures provided herein, will understand that various operations or steps of computer-implemented method 800 or any of the other methods disclosed herein may be adapted, modified, rearranged, performed simultaneously, include operations not illustrated, and/or modified in various ways without deviating from the scope of the present disclosure.

At 802, computer-implemented method 800 can include monitoring (e.g., by computing device 110 using facial recognition module 122 and/or feature tracking algorithm 124) a chat view (e.g., chat view 302) associated with a video chat session (e.g., a video chat session conducted using video chat application 120, video chat application 220, and/or video chat system 222).

At 804, computer-implemented method 800 can include detecting (e.g., by computing device 110 using facial recognition module 122 and/or authorized participant face set 402) an entity (e.g., a human) in the chat view.

At 806, computer-implemented method 800 can include determining (e.g., by computing device 110 using facial recognition module 122 and/or authorized participant face set 402) whether the entity is an authorized participant (e.g., authorized participant 304).

If it is determined at 806 that the entity is not an authorized participant, at 808, computer-implemented method 800 can include concealing (e.g., by computing device 110) visual data indicative of the entity in the chat view. For example, computing device 110 can conceal (e.g., blur, mask, hide) visual data corresponding to unauthorized participant 308 as described above and illustrated in the example embodiment depicted in FIG. 3C. In the example embodiment depicted in FIG. 8, computer-implemented method 800 can further include returning to operation 802 from operation 808 and/or repeating operations 802, 804, and 806 until it is determined at operation 806 that the entity is an authorized participant.

If it is determined at 806 that the entity is an authorized participant, at 810, computer-implemented method 800 can include rendering (e.g., by computing device 110) visual data indicative of the entity in the chat view. For example, computing device 110 can render (e.g., visually display) visual data corresponding to authorized participant 304 as described above and illustrated in the example embodiment depicted in FIG. 3C.

At 812, computer-implemented method 800 can include defining (e.g., by computing device 110 using facial recognition module 122 and/or feature tracking algorithm 124), in the chat view, a chat zone (e.g., chat zone 306) indicative of a reference location of the entity (e.g., a location and/or orientation usually occupied by authorized participant 304 during a video chat session).

At 814, computer-implemented method 800 can include tracking (e.g., by computing device 110 using facial recognition module 122 and/or feature tracking algorithm 124) movement of the entity in the chat view.

At 816, computer-implemented method 800 can include determining (e.g., by computing device 110 using facial recognition module 122, feature tracking algorithm 124, and/or chat zone pose set 404) whether the entity moved outside of the chat zone.

If it is determined at 816 that the entity has not moved outside the chat zone, computer-implemented method 800 can further include returning to operation 814 from operation 816 and/or repeating operations 814 and 816 until it is determined at operation 816 that the entity has moved outside the chat zone.

If it is determined at 816 that the entity has moved outside the chat zone, at 818, computer-implemented method 800 can include concealing (e.g., by computing device 110) visual data indicative of the entity in the chat view. For example, computing device 110 can conceal (e.g., blur, mask, hide) visual data corresponding to authorized participant 304 as described above and illustrated in the example embodiment depicted in FIG. 3B.

At 820, computer-implemented method 800 can again include tracking (e.g., by computing device 110 using facial recognition module 122 and/or feature tracking algorithm 124) movement of the entity in the chat view.

At 822, computer-implemented method 800 can include determining (e.g., by computing device 110 using facial recognition module 122, feature tracking algorithm 124, and/or chat zone pose set 404) whether the entity returned to the chat zone.

If it is determined at 822 that the entity has returned to the chat zone, at 824, computer-implemented method 800 can include rendering (e.g., by computing device 110) visual data indicative of the entity in the chat view. For example, computing device 110 can render (e.g., visually display) visual data corresponding to authorized participant 304 as described above and illustrated in the example embodiment depicted in FIG. 3A. In the example embodiment depicted in FIG. 8, computer-implemented method 800 can further include returning to operation 814 from operation 824 and/or repeating operations 814, 816, 818, 820, and 822.

If it is determined at 822 that the entity has not returned to the chat zone, at 826, computer-implemented method 800 can include determining (e.g., by computing device 110 using video chat application 120, video chat application 220, and/or video chat system 222) whether the video chat session has ended.

If it is determined at 826 that the video session has not ended, computer-implemented method 800 can further include returning to operation 820 from operation 826 and/or repeating operations 820, 822, and 826 until it is determined at operation 826 that the video chat session has ended.

If it is determined at 826 that the video session has ended, at 828, computer-implemented method 800 can end (e.g., be terminated and/or stopped by computing device 110).

The technology discussed herein makes reference to servers, databases, software applications, and other computer-based systems, as well as actions performed by, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computing device, comprising:
   one or more processors; and
   one or more non-transitory computer-readable media that store instructions that, when executed by the one or more processors, cause the computing device to perform operations, the operations comprising:
   identifying, in a chat view associated with a video chat session, a first authorized participant and a second authorized participant of the video chat session;
   rendering, in the chat view, first visual data indicative of the first authorized participant and second visual data indicative of the second authorized participant based at least in part on identification of the first authorized participant and the second authorized participant, respectively;
   defining, in the chat view, a chat zone indicative of a reference location of the first authorized participant, wherein defining the chat zone comprises performing a chat zone calibration process using a facial recognition module to define the chat zone in the chat view based at least in part on reference key point data corresponding to the first authorized participant, the reference key point data being descriptive of the first authorized participant and indicative of the first authorized participant being positioned at a reference location;
   determining that the first authorized participant moved outside the chat zone; and
   concealing, in the chat view, the first visual data indicative of the first authorized participant based at least in part on determination that the first authorized participant moved outside the chat zone.

2. The computing device of claim 1, wherein the operations further comprise:
   maintaining, in the chat view, rendition of the second visual data indicative of the second authorized participant based at least in part on the determination that the first authorized participant moved outside the chat zone.

3. The computing device of claim 1, wherein the operations further comprise:
performing a face calibration process using a facial recognition module to authenticate at least one of the first authorized participant or the second authorized participant as an authorized participant of the video chat session.

4. The computing device of claim 1, wherein the operations further comprise:
implementing a facial recognition module to detect, in the chat view, at least one of the first authorized participant, the second authorized participant, or an unauthorized participant of the video chat session.

5. The computing device of claim 1, wherein the operations further comprise:
detecting, in the chat view, an unauthorized participant of the video chat session; and
concealing, in the chat view, third visual data indicative of the unauthorized participant based at least in part on detection of the unauthorized participant.

6. The computing device of claim 5, wherein the operations further comprise:
providing a notification indicating at least one of the detection of the unauthorized participant or concealment of the third visual data in the chat view.

7. The computing device of claim 1, wherein the operations further comprise:
performing a pose estimation process using a feature tracking algorithm to determine that the first authorized participant moved outside the chat zone.

8. The computing device of claim 1, wherein the operations further comprise:
performing a pose estimation process to determine that the first authorized participant moved outside the chat zone, the pose estimation process comprising:
comparing runtime key point data corresponding to the first authorized participant with reference key point data corresponding to the first authorized participant, the reference key point data being descriptive of the first authorized participant and indicative of the first authorized participant being positioned at the reference location, and the runtime key point data being descriptive of the first authorized participant and indicative of the first authorized participant being positioned at one or more second locations that are different from the reference location.

9. The computing device of claim 8, wherein comparing the runtime key point data corresponding to the first authorized participant with the reference key point data corresponding to the first authorized participant comprises:
comparing runtime distances between key points of the runtime key point data with reference distances between key points of the reference key point data to determine whether a difference between one of the runtime distances and one of the reference distances exceeds a defined threshold value.

10. The computing device of claim 1, wherein rendering, in the chat view, at least one of the first visual data indicative of the first authorized participant or the second visual data indicative of the second authorized participant comprises:
rendering, in a foreground section of the chat view, at least one of the first visual data indicative of the first authorized participant or the second visual data indicative of the second authorized participant.

11. The computing device of claim 1, wherein concealing, in the chat view, the first visual data indicative of the first authorized participant based at least in part on the determination that the first authorized participant moved outside the chat zone comprises:
concealing, in a background section of the chat view, the first visual data indicative of the first authorized participant based at least in part on the determination that the first authorized participant moved outside the chat zone.

12. A computer-implemented method of modifying visual data in a chat view associated with a video chat session, the computer-implemented method comprising:
identifying, by a computing device comprising one or more processors, in the chat view, an authorized participant of the video chat session;
rendering, by the computing device, in the chat view, first visual data indicative of the authorized participant based at least in part on identification of the authorized participant;
performing, by the computing device, a chat zone calibration process using a facial recognition module to define a chat zone in the chat view based at least in part on reference key point data corresponding to the authorized participant, the reference key point data being descriptive of the authorized participant and indicative of the authorized participant being positioned at a reference location;
detecting, by the computing device, in the chat view, an unauthorized participant of the video chat session; and
concealing, by the computing device, in the chat view, second visual data indicative of the unauthorized participant based at least in part on detection of the unauthorized participant.

13. The computer-implemented method of claim 12, wherein rendering, by the computing device, in the chat view, the first visual data indicative of the authorized participant comprises rendering, by the computing device, in a foreground section of the chat view, the first visual data indicative of the authorized participant, and wherein concealing, by the computing device, in the chat view, the second visual data indicative of the unauthorized participant comprises concealing, by the computing device, in a background section of the chat view, the second visual data indicative of the unauthorized participant.

14. The computer-implemented method of claim 12, wherein the operations further comprise:
identifying, by the computing device, in a background section of the chat view, a second authorized participant of the video chat session; and
rendering, by the computing device, in the background section of the chat view, third visual data indicative of the second authorized participant based at least in part on identification of the second authorized participant.

15. The computer-implemented method of claim 14, wherein at least one of the first visual data indicative of the authorized participant or the third visual data indicative of the second authorized participant has a first defined resolution, and wherein the second visual data indicative of the unauthorized participant has a second defined resolution that is less than the first defined resolution.

16. One or more non-transitory computer-readable media that store instructions that, when executed by one or more processors of a computing device, cause the computing device to perform operations, the operations comprising:
defining, in a chat view associated with a video chat session, a chat zone indicative of a reference location of a participant in the video chat session, wherein defining the chat zone comprises performing a chat zone calibration process using a facial recognition module to define the chat zone in the chat view based at least in part on reference key point data corresponding to the participant, the reference key point data being descriptive of the participant and indicative of the participant being positioned at the reference location;

determining that the participant moved outside the chat zone; and concealing, in the chat view, visual data indicative of the participant based at least in part on determination that the participant moved outside the chat zone.

17. The one or more non-transitory computer-readable media of claim 16, wherein the operations further comprise:

determining that the participant returned to the chat zone.

18. The one or more non-transitory computer-readable media of claim 17, wherein the operations further comprise:

rendering, in the chat view, the visual data indicative of the participant based at least in part on determination that the participant returned to the chat zone.

19. The one or more non-transitory computer-readable media of claim 16, wherein the operations further comprise:

performing a pose estimation process using a feature tracking algorithm to determine at least one of: the participant moved outside the chat zone; or the participant returned to the chat zone.

20. The one or more non-transitory computer-readable media of claim 16, wherein concealing, in the chat view, the visual data indicative of the participant based at least in part on the determination that participant moved outside the chat zone comprises:

concealing, in a background section of the chat view, the visual data indicative of participant based at least in part on the determination that the participant moved outside the chat zone.

\* \* \* \* \*